US012780072B2

(12) United States Patent
Moriya

(10) Patent No.: US 12,780,072 B2
(45) Date of Patent: Nov. 3, 2026

(54) TRANSPORT SYSTEM AND CARGO VEHICLE

(71) Applicant: DENSO CORPORATION, Kariya-city (JP)

(72) Inventor: Akihiko Moriya, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 101 days.

(21) Appl. No.: 18/919,201

(22) Filed: Oct. 17, 2024

(65) Prior Publication Data

US 2025/0033548 A1 Jan. 30, 2025

Related U.S. Application Data

(63) Continuation of application No. PCT/JP2023/010857, filed on Mar. 20, 2023.

(30) Foreign Application Priority Data

Apr. 19, 2022 (JP) ................................ 2022-069051

(51) Int. Cl.

| | |
|---|---|
| ***B60P 1/36*** | (2006.01) |
| ***B60P 3/00*** | (2006.01) |
| ***E05F 15/60*** | (2015.01) |

(52) U.S. Cl.

CPC ................. *B60P 1/36* (2013.01); *B60P 3/007* (2013.01); *E05F 15/60* (2015.01); *E05Y 2400/30* (2013.01); *E05Y 2900/516* (2013.01); *E05Y 2900/532* (2013.01)

(58) Field of Classification Search

None

See application file for complete search history.

(56) References Cited

U.S. PATENT DOCUMENTS

| | | | | |
|---|---|---|---|---|
| 5,391,046 A * | 2/1995 | Colamussi | B65G 67/20 414/667 |
| 2005/0056576 A1* | 3/2005 | Koini | B64F 1/368 209/630 |
| 2020/0377317 A1 | 12/2020 | Zoghzoghy et al. | |
| 2021/0157300 A1 | 5/2021 | Takai et al. | |

FOREIGN PATENT DOCUMENTS

| | | |
|---|---|---|
| CN | 210011662 U | 2/2020 |
| CN | 114056216 A | 2/2022 |
| JP | H5-294181 A | 11/1993 |

* cited by examiner

*Primary Examiner* — Kristy A Haupt

(74) *Attorney, Agent, or Firm* — Precision Patents, P.C.

(57) ABSTRACT

A transport system transports luggage between a cargo vehicle and a transport robot. The transport system includes: container unit that accommodates the luggage in a luggage compartment to be arranged in a longitudinal direction; a door unit that opens and closes in a lateral direction; a conveyor unit that retrieves the luggage from the luggage compartment in the lateral direction through the door unit to transfer the luggage to the transport robot; and a control unit that controls an opening operation and a closing operation of the door unit and a displacement of the luggage by the conveyor unit.

11 Claims, 37 Drawing Sheets

TRANSPORT SYSTEM AND CARGO VEHICLE

CROSS REFERENCE TO RELATED APPLICATION

The present application is a continuation application of International Patent Application No. PCT/JP2023/010857 filed on Mar. 20, 2023, which designated the U.S. and claims the benefit of priority from Japanese Patent Application No. 2022-069051 filed on Apr. 19, 2022. The entire disclosures of all of the above applications are incorporated herein by reference.

TECHNICAL FIELD

The present disclosure relates to techniques for transporting multiple packages.

BACKGROUND

A conceivable technique teaches a technique for transporting multiple pieces of luggage by accommodating them in a luggage compartment of a container unit mounted on the load bed of a cargo vehicle so that the pieces of luggage can be transferred to the outside of the vehicle.

SUMMARY

According to an example, a transport system transports luggage between a cargo vehicle and a transport robot. The transport system may include: container unit that accommodates the luggage in a luggage compartment to be arranged in a longitudinal direction; a door unit that opens and closes in a lateral direction; a conveyor unit that retrieves the luggage from the luggage compartment in the lateral direction through the door unit to transfer the luggage to the transport robot; and a control unit that controls an opening operation and a closing operation of the door unit and a displacement of the luggage by the conveyor unit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
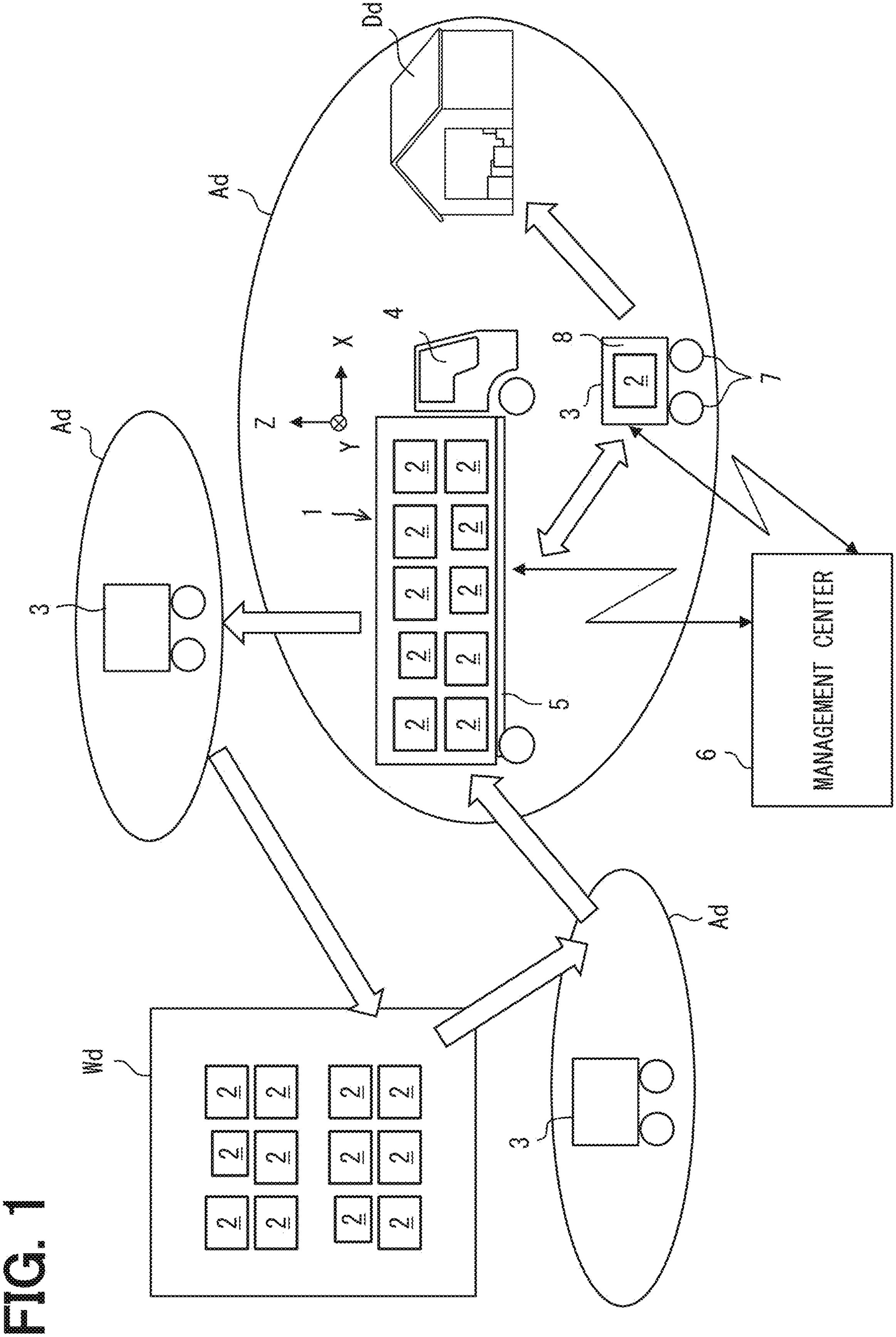
FIG. 1 is a schematic diagram for explaining the overall configuration of a first embodiment.

In the technique according to the conceivable technique, multiple pieces of luggage are lined up in the longitudinal direction of the cargo vehicle, which is longer than the horizontal direction, and in the height direction of the cargo vehicle, and the luggage is transferred through a door unit of the cargo vehicle that is opened in the longitudinal direction. Therefore, it may be inefficient and time-consuming to load and unload the luggage to and from a loading position of the luggage that is spaced from the door unit in the luggage compartment along the longitudinal direction.

The technique according to the conceivable technique is executed under a condition that the luggage to be displaced is displaced in response to human operation. For example, in recent years, in order to solve the last one-mile difficulty, there have been expectations for a transport system in which luggage is transferred from a cargo vehicle to a transport robot, so that the efficiency of luggage transferring is improved to shorten the transfer time and transport time.

An object of the present embodiments is to provide a transport system that improves the efficiency of the transferring of luggage from a cargo vehicle to a transport robot.

Hereinafter, technical means of the present embodiments for solving the difficulties will be described.

According to a first example embodiment, a transport system mounted on a load bed of a cargo vehicle for transferring a plurality of pieces of luggage to a transport robot, the transport system includes:

- a container unit in which the plurality of pieces of the luggage are arranged in a longitudinal direction of the cargo vehicle, which is longer than a lateral direction of the cargo vehicle to accommodate the plurality of pieces of the luggage in a luggage compartment;
- a door unit that opens and closes in the lateral direction with respect to the container unit;
- a conveyor unit that retrieves the plurality of pieces of the luggage from the luggage compartment in the lateral direction through the door unit which is opened to transport the plurality of pieces of the luggage to a transport robot; and
- a control unit that controls an opening operation and a closing operation of the door unit and a displacement operation of the plurality of pieces of the luggage by the conveyor unit.

A second example of the present embodiments is a cargo vehicle on which the transport system of the first example is mounted.

According to the first and second examples, the door unit is opened and closed according to the control of the control unit in the lateral direction with respect to the container unit in which the plurality of pieces of the luggage are arranged in the longitudinal direction of the cargo vehicle, which is longer than the lateral direction of the cargo vehicle to accommodate the plurality of pieces of the luggage in the luggage compartment. Therefore, when the conveyor unit retrieves the plurality of pieces of the luggage from the luggage compartment in the lateral direction through the door unit which is opened to transport the plurality of pieces of the luggage to the transport robot, according to the control of the control unit, the transfer time can be shortened. Therefore, it is possible to automate the transfer of the luggage from the cargo vehicle to the transport robot, thereby improving efficiency.

The following will describe embodiments of the present disclosure with reference to the drawings. It should be noted that the same reference symbols are assigned to corresponding components in the respective embodiments, and repeated descriptions may be omitted. When only a part of the configuration is described in each embodiment, the configurations of the other embodiments described above can be applied to remaining part of the configuration. Further, not only the combinations of the configurations explicitly shown in the description of the respective embodiments, but also the configurations of the multiple embodiments can be partially combined together even if the configurations are not explicitly described under a condition that there is no difficulty in the combination in particular.

First Embodiment

A transport system 1 of a first embodiment shown in FIG. 1 is mounted on a load bed 5 of a cargo vehicle 4 to transport a plurality of pieces of luggage 2 so as to be able to transfer the plurality of pieces of luggage 2 to at least one transport robot 3. Here, a plurality of pieces of the luggage 2 are loaded onto the load bed 5 in a logistics warehouse Wd, and then transported to at least one delivery area Ad by the travelling with the cargo vehicle 4. The transported luggage 2 is automatically loaded from and unloaded to the transport robot 3 by the transport system 1, and is delivered to the delivery destination Dd within the delivery area Ad by the autonomous driving operation of the transport robot 3. The transport system 1 and the transport robot 3 share delivery information required for delivering the luggage 2 through at least one of mutual communication and communication between each of the transport system 1 and the transport robot 3 and the management center 6.

The transport robot 3 is a small electric mobility vehicle that can move autonomously in any direction, forward, backward, left or right, by driving the wheels 7 with an electric motor. The transport robot 3 receives the luggage 2 from the transport system 1 mounted on the cargo vehicle 4 that has arrived at the delivery area Ad of the delivery destination Dd. The transport robot 3 receives the luggage 2 from the transport system 1 and accommodates the luggage 2 in a hollow accommodation unit 8, and moves autonomously along a route to the delivery destination Dd. The transfer robot 3 has a built-in communication unit that controls communication between the transfer robot 3 and at least one of the transfer system 1 and the management center 6. The transport robot 3 is controlled by an internal control unit so as to complete the process from receipt to delivery of the luggage 2 based on the delivery information acquired through such communication.

In order to load and unload the luggage 2 to and from the transport robot 3 at the appropriate time, the transport system 1 shown in FIGS. 1 to 4 includes a container unit 10, a door unit 20, a conveyor unit 30, a lift unit 40, a communication unit 50, and a control unit 60. In the following description, the longitudinal direction X of the transport system 1 is defined as the front-rear direction among the horizontal directions of the cargo vehicle 4 with respect to a horizontal plane. The lateral direction Y of the transport system 1 is defined as the left-right direction among the horizontal directions of the cargo vehicle 4 with respect to a horizontal plane. The height direction Z of the transport system 1 is defined as the vertical direction (i.e., the up-down direction) of the cargo vehicle 4 with respect to a horizontal plane. Under these definitions, the transport system 1 may be provided as one set on one side of the cargo vehicle in the lateral direction Y so as to be capable of transferring the luggage 2, or provided as a plurality of sets of the transport system 1 disposed on both sides of the cargo vehicle in the lateral direction Y so as to be capable of transferring the luggage 2 with sharing at least the container unit 10.

Figure 2:
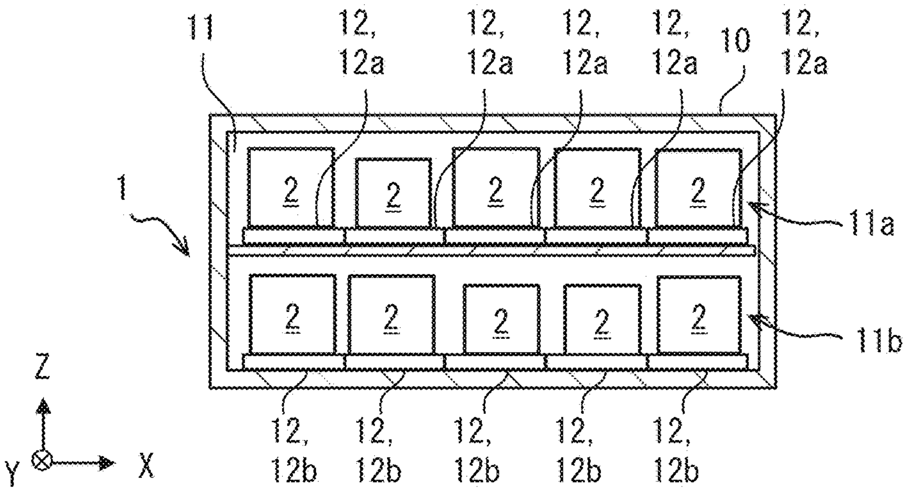
FIG. 2 is a schematic diagram showing a cross-sectional view of a transport system according to the first embodiment.
Figure 3:
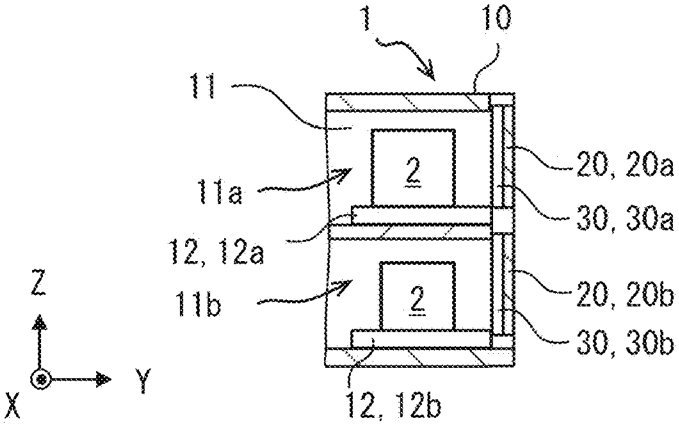
FIG. 3 is a schematic diagram showing a cross-sectional view of a transport system according to the first embodiment.
Figure 4:
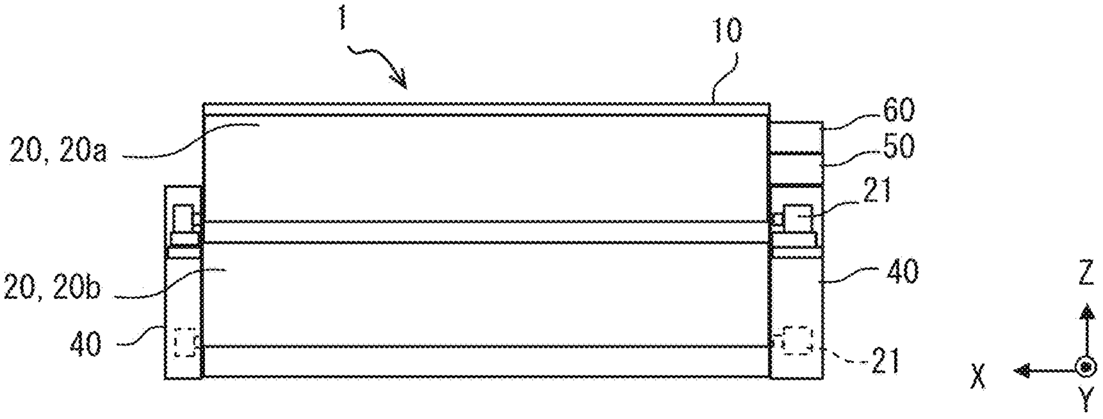
FIG. 4 is a schematic diagram showing a side view of a transport system according to the first embodiment.

As shown in FIGS. 2 to 4, the container unit 10 has a generally rectangular hollow shape as a whole and is formed mainly from, for example, metal. The container unit 10 is fixed onto the load bed 5 of the cargo vehicle 4 (see FIG. 1) in a detachable manner or a non-detachable manner. The container unit 10 has a rectangular parallelepiped shape with the longitudinal direction X being longer than the lateral direction Y, in accordance with the shape of the load bed 5. The container unit 10 defines a luggage compartment 11 whose length is longer in the longitudinal direction X than in the lateral direction Y so that a plurality of pieces of the luggage 2 can be accommodated inside to be arranged at least in the longitudinal direction X. Furthermore, in the container unit 10, the luggage compartment 11 is defined in such a manner that the pieces of the luggage 2 can be accommodated inside the luggage compartment 11 by arranging the pieces of the luggage 2 in the height direction Z on each of a plurality of layers 11*a*, 11*b* set in the height direction Z.

Figure 5:
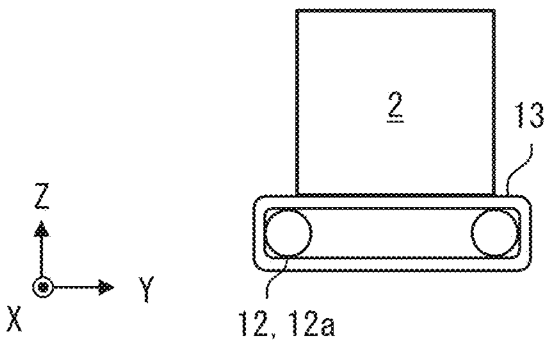
FIG. 5 is a schematic diagram showing a front view of a conveyor element of the transport system according to the first embodiment.

As shown in FIGS. 2, 3 and 5, in the container unit 10, a plurality of conveyor elements 12 are arranged in the longitudinal direction X for each of the layers 11*a* and 11*b*. Each conveyor element 12 includes a belt conveyor mainly having a combination of an individual electric motor and a conveyor belt 13. Each conveyor element 12 drives the conveyor belt 13 in the lateral direction Y on the upper surface side by an electric motor, thereby enabling the luggage 2 loaded on the conveyor belt 13 to displace individually in the same lateral direction Y. Hereinafter, the conveyor element 12 corresponding to the upper layer 11*a* will be referred to as the upper conveyor element 12*a*, and the conveyor element 12 corresponding to the lower layer 11*b* will be referred to as the lower conveyor element 12*b*.

As shown in FIGS. 3, 4, and 6 to 9, the door units 20 are arranged individually for each of the layers 11*a*, 11*b* at the ends of the container unit 10 in the lateral direction Y, and are arranged side by side in the height direction Z. Hereinafter, the door unit 20 corresponding to the upper layer 11*a* will be referred to as the upper door unit 20*a*, and the door unit 20 corresponding to the lower layer 11*b* will be referred to as the lower door unit 20*b*.

Each of the upper and lower door units 20*a*, 20*b* has a generally rectangular flat plate shape and is formed mainly from, for example, metal. Each of the upper and lower door units 20*a*, 20*b* is attached to the container unit 10 so as to be openable and closable in the lateral direction Y above the load bed 5 of the cargo vehicle 4 (see FIG. 1). An opening/closing unit 21 is provided on each of the upper and lower door units 20*a*, 20*b*. In order to drive the upper and lower door units 20*a*, 20*b* to open and close by swinging independently of each other, each opening/closing unit 21 mainly includes an individual electric motor.

Each of the upper and lower door units 20*a*, 20*b* closes the luggage compartment 11 from one side in the lateral direction Y in a state in which each of the upper and lower door units 20*a*, 20*b* extends in the longitudinal direction X and the height direction Z (i.e., the vertical on the horizontal plane). In such a close state, each of the upper and lower door units 20*a*, 20*b* partially constitutes a side wall portion of the container unit 10 in the lateral direction Y. Each of the upper and lower door units 20*a*, 20*b* opens the luggage compartment 11 toward one side in the lateral direction Y in a state in which each of the upper and lower door units 20*a*, 20*b* extends in the longitudinal direction X and the lateral direction Y (i.e., the horizontal on the horizontal plane).

As shown in FIGS. 3 and 6 to 9, the conveyor units 30 are arranged individually for each of the layers 11*a*, 11*b* at the ends of the container unit 10 in the lateral direction Y, and are arranged side by side in the height direction Z. Hereinafter, the conveyor unit 30 corresponding to the upper layer 11*a* will be referred to as the upper conveyor unit 30*a*, and the conveyor unit 30 corresponding to the lower layer 11*b* will be referred to as the lower conveyor unit 30*b*.

Each of the upper and lower conveyor units 30*a*, 30*b* is attached to the container unit 10 via the corresponding door unit 20*a*, 20*b* so as to be able to swing integrally with the corresponding door unit 20*a*, 20*b* on the load bed 5 of the cargo vehicle 4. (see FIG. 1) Each of the upper and lower conveyor units 30*a* and 30*b* includes a ball conveyor mainly having a set of a plurality of individual transport balls 31 and an electric drive source.

Figure 6:
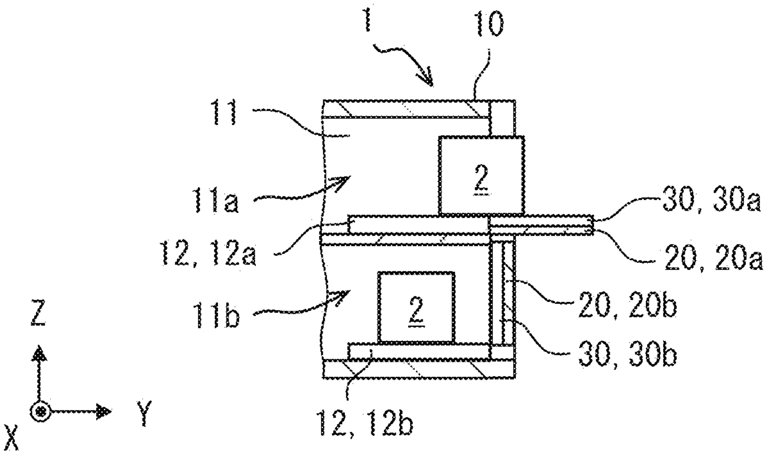
FIG. 6 is a schematic diagram showing a cross-sectional view of a transport system according to the first embodiment.
Figure 7:
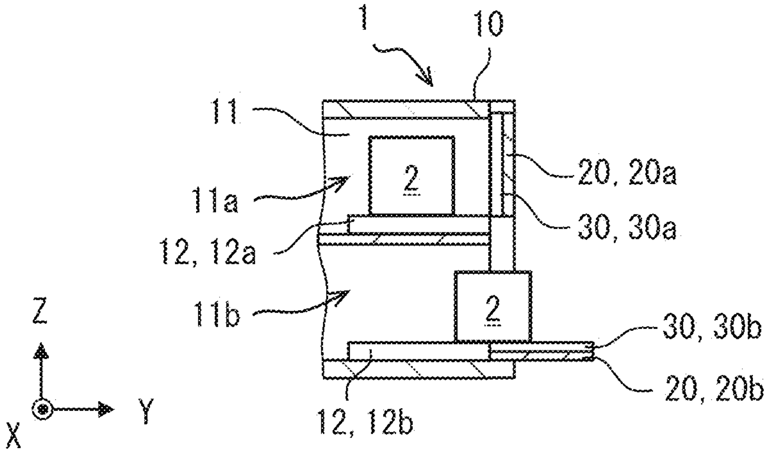
FIG. 7 is a schematic diagram showing a cross-sectional view of a transport system according to the first embodiment.
Figure 8:
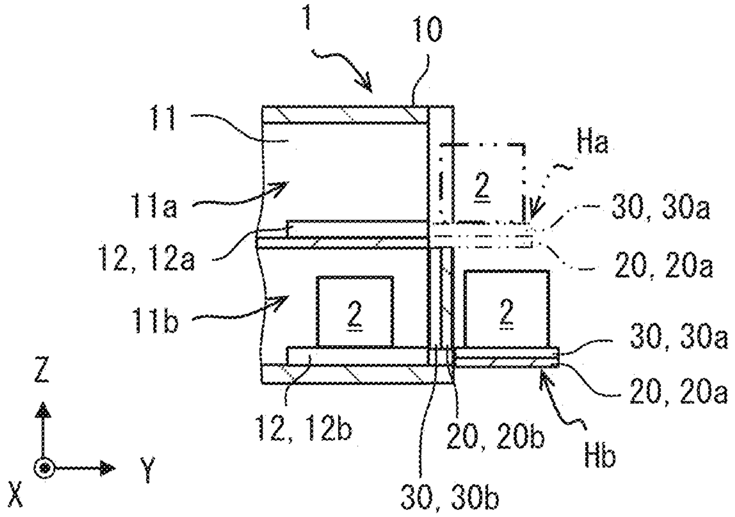
FIG. 8 is a schematic diagram showing a cross-sectional view of a transport system according to the first embodiment.

As shown in FIGS. 6 and 7, when the corresponding door units 20*a*, 20*b* are in an open state, each of the upper and lower conveyor units 30*a*, 30*b* receives the luggage retrieved from the luggage compartment 11 by the corresponding conveyor element 12*a*, 12*b* onto each transport ball 31 located at the retrieve destination in the horizontal direction Y. Each of the upper and lower conveyor units 30*a* and 30*b* rotates and drives each transport ball 31 located at the retrieve destination by an electric drive source, thereby displacing the luggage 2 in one of the lateral direction Y and the longitudinal direction X, which is controlled by the control unit 60 (that is only the lateral direction Y in the first embodiment). In particular, the lower conveyor unit 30*b* is capable of displacing the luggage 2 in the lateral direction Y above the lower door unit 20*b* in the open state as shown in FIG. 7, thereby transferring the luggage 2 to the transport robot 3 positioned in the same lateral direction Y.

Figure 9:
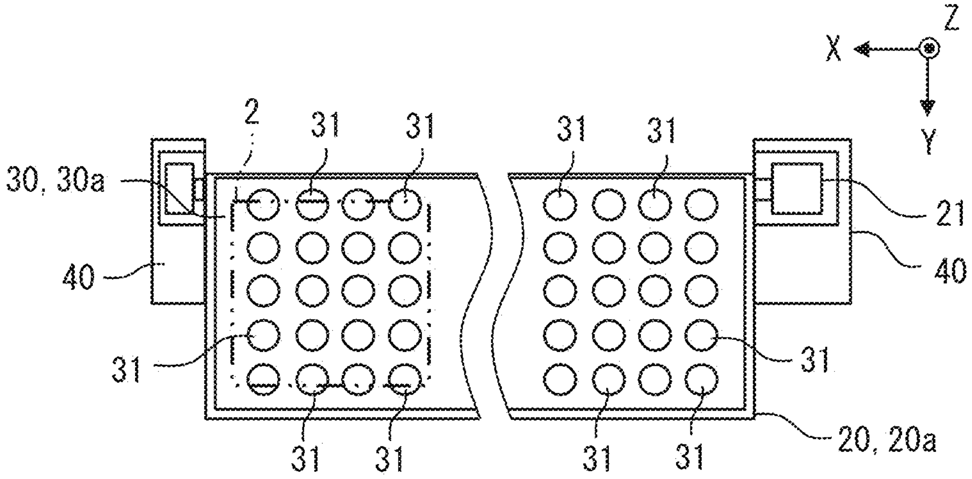
FIG. 9 is a schematic diagram showing a plan view of a transport system according to the first embodiment.

As shown in FIGS. 4 and 9, the lift units 40 are disposed at both ends of the container unit 10 in the longitudinal direction X, and are provided bridging between the layers 11*a*, 11*b* in the height direction Z (see FIGS. 2 and 3). The lift unit 40 is attached to the container unit 10 so as to be capable of lifting the upper door unit 20*a* and its opening/closing unit 21 in the height direction Z above the load bed 5 of the cargo vehicle 4 (see FIG. 1). The lift unit 40 includes a lift component mainly having a lift mechanism and an electric drive source.

The lift unit 40 provides one of the lifting up and the lifting down of the upper door unit 20*a*, which is integral with the upper conveyor unit 30*a*, controlled by the control unit 60. As shown particularly in FIG. 8, the lift unit 40 is capable of initially pulling out the upper door unit 20*a* at the uppermost position Ha (see two-dot chain line in FIG. 8), which supports the luggage 2 retrieved onto the upper conveyor unit 30*a* in the open state, in the lateral direction Y, and then lifting the luggage 2 down in the vertical direction Z to the lowermost position Hb corresponding to the lower layer 11*b*. Therefore, the upper conveyor unit 30*a* is able to transfer the luggage 2 to the transport robot 3 positioned in the lateral direction Y by displacing the luggage 2 supported by the upper conveyor unit 30*a* in the lateral direction Y above the upper door unit 20*a* in an open state lifted down to the lowermost position Hb.

The communication unit 50 shown in FIG. 4 is held by the container unit 10. The communication unit 50 may be replaced by a communication unit mounted in the cargo vehicle 4. The communication unit 50 mainly includes a communication device such as DSRC (i.e., Dedicated Short Range Communications) or Cellular V2X (i.e., C-V2X), which is capable of communicating with at least one of the transport robot 3 and the management center 6. The communication unit 50 may include a Global Navigation Satellite System (i.e., GNSS) receiver to recognize the travel position of the cargo vehicle 4.

Figure 10:
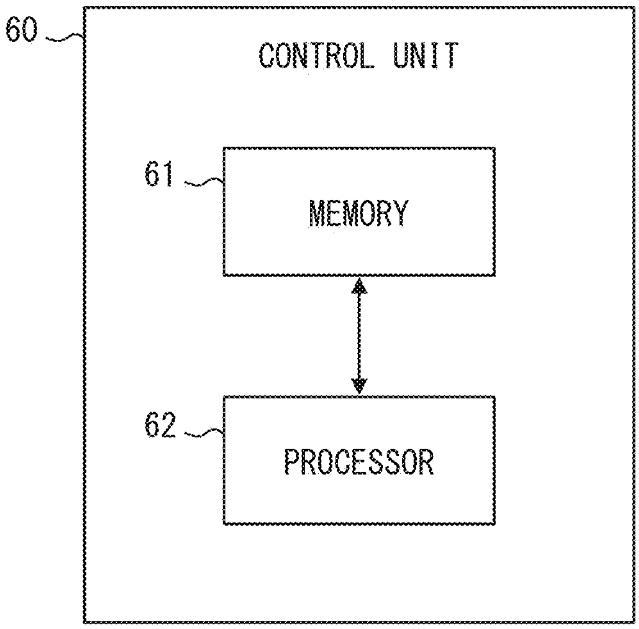
FIG. 10 is a block diagram showing a control unit of the transport system according to the first embodiment.
Figure 11:
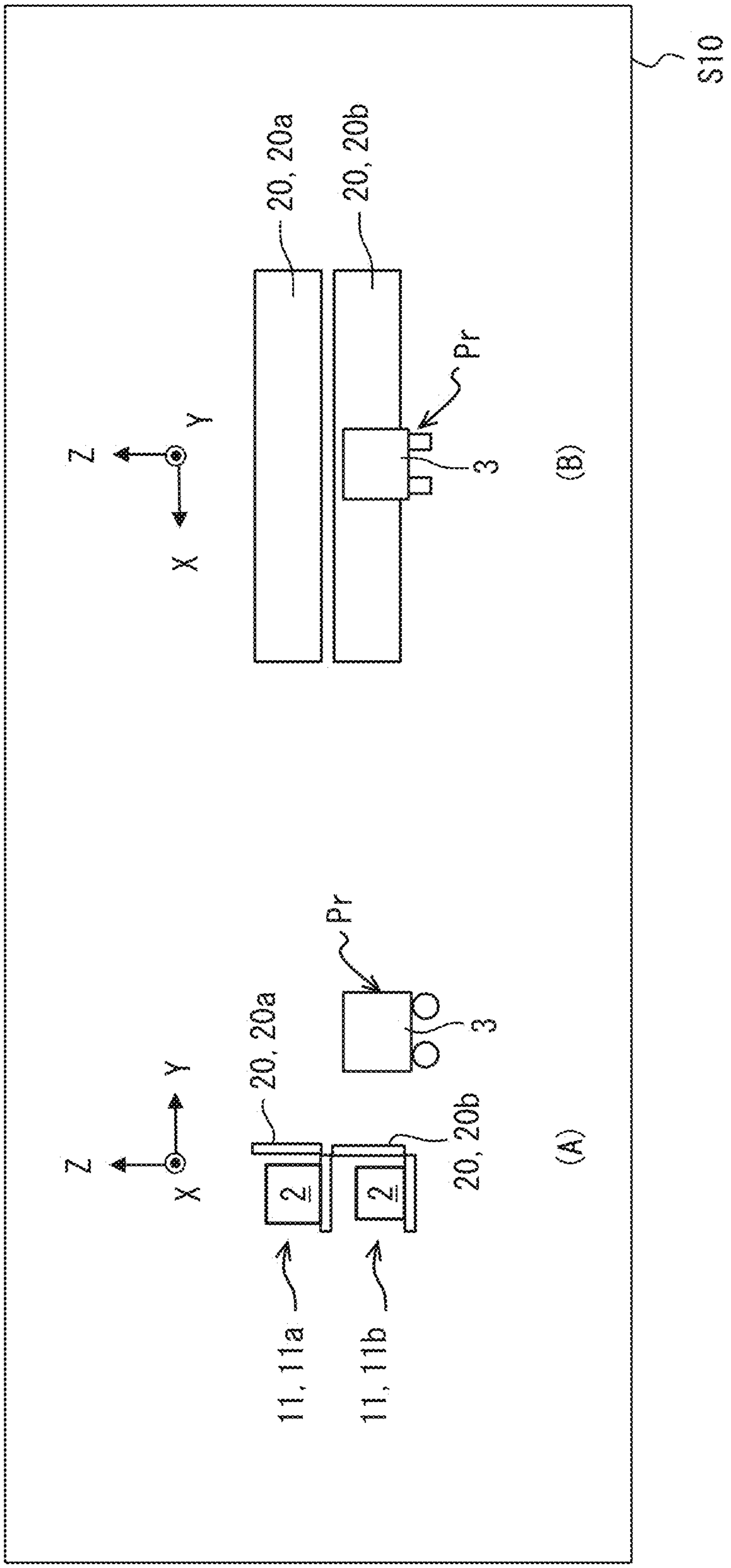
FIG. 11 is a diagram showing a cross-sectional view in (A) and a side view in (B) for an operation example of the transport system according to the first embodiment.

The control unit 60 is held in the container unit 10. The control unit 60 may be replaced by a control unit mounted in the cargo vehicle 4. As shown in FIG. 10, the control unit 60 is connected to the electric components 12 (i.e., 12*a*, 12*b*), 21, 30 (i.e., 30*a*, 30*b*), 40, and 50 of the transport system 1 via at least one of, for example, a LAN (i.e., Local Area Network) line, a wire harness, and an internal bus. The control unit 60 mainly includes a dedicated computer having at least one memory 61 and one processor 62.

The memory 61 of the control unit 60 is at least one type of non-transitory tangible storage medium of, for example, a semiconductor memory, a magnetic storage medium, and an optical storage medium, for non-transitory storing computer readable programs, data, and the like. For example, the processor 62 of the control unit 60 may include at least one of a central processing unit (i.e., CPU), a graphics processing unit (i.e., GPU), a reduced instruction set computer (i.e., RISC) CPU, a data flow processor (i.e., DFP), a graph streaming processor (i.e., GSP), or the like.

In the control unit 60, the processor 62 executes a plurality of instructions included in the control program stored in the memory 61 to transmit and receive control-related signals between the electric components 12 (i.e., 12*a*, 12*b*), 21, 30 (i.e., 30*a*, 30*b*), 40, and 50 of the transport system 1. As a result, the control unit 60 controls the opening and closing of each of the upper and lower door units 20*a*, 20*b*, the displacement of the luggage 2 by each of the upper and lower conveyor elements 12*a*, 12*b* and each of the upper and lower conveyor units 30*a*, 30*b*, and the driving of the upper door unit 20*a* by the lift unit 40.

An operation example of the transport system 1 that operates under the control of the control unit 60 in the first embodiment will be described. The operation example of the first embodiment shown in FIGS. 11 to 15 is an example of the process up to the transfer of the luggage 2 loaded on the upper layer 11*a* in the luggage compartment 11 to the transport robot 3. As shown at S10 in FIG. 11, the transport robot 3 arrives at a transfer position Pr in the longitudinal direction X corresponding to the loading position of the luggage 2 to be transferred, and stops to receive the luggage 2.

Figure 12:
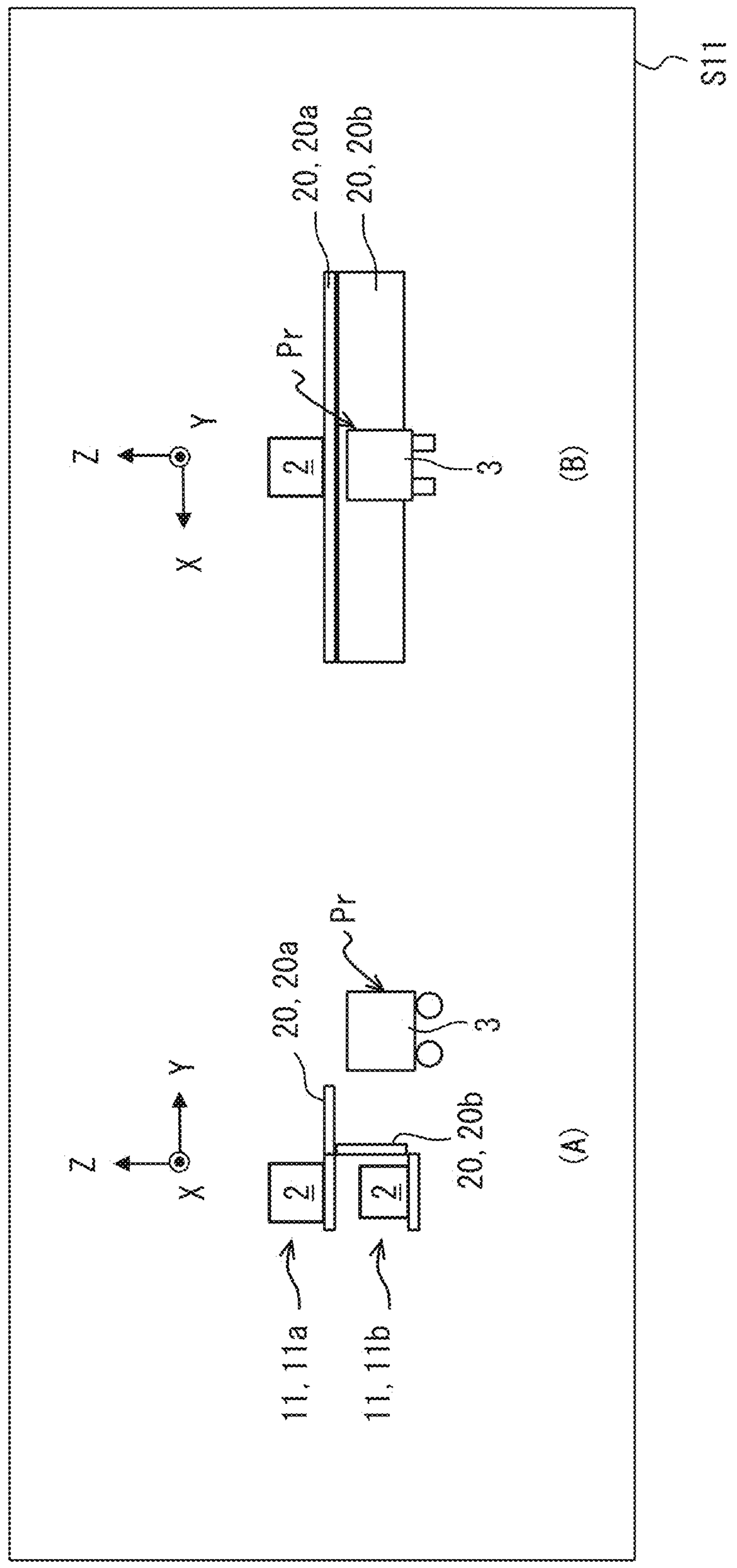
FIG. 12 is a diagram showing a cross-sectional view in (A) and a side view in (B) for an operation example of the transport system according to the first embodiment.
Figure 13:
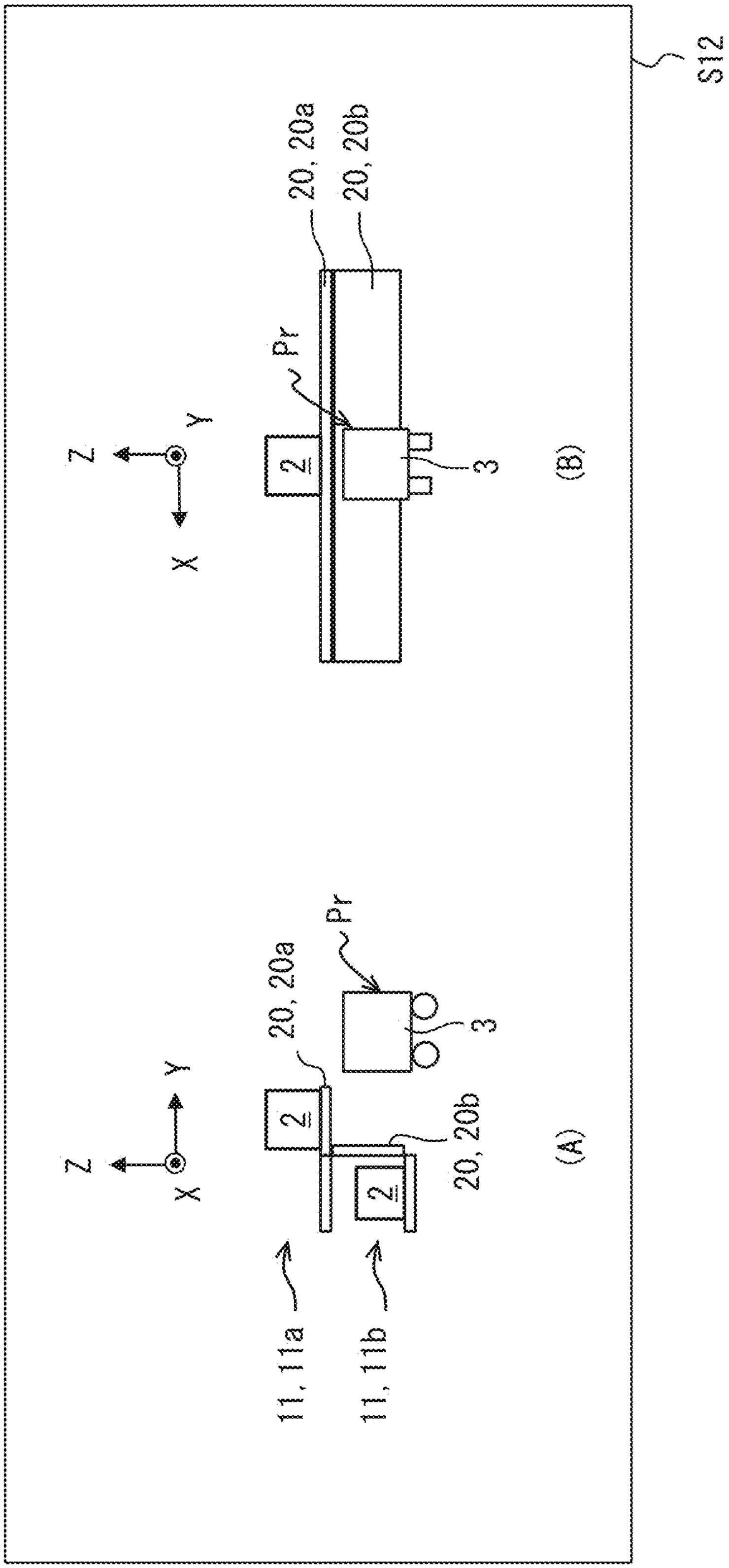
FIG. 13 is a diagram showing a cross-sectional view in (A) and a side view in (B) for an operation example of the transport system according to the first embodiment.

At S11 shown in FIG. 12, the control unit 60 controls the opening/closing unit 21 of the upper door unit 20*a* as an opening target door unit so as to open the upper door unit 20*a* in the lateral direction Y. At S12 shown in FIG. 13, the control unit 60 controls the upper conveyor element 12*a*, on which the luggage 2 is loaded, together with the upper conveyor unit 30*a* so as to retrieve the luggage 2 from the upper layer 11*a* of the luggage compartment 11 in the lateral direction Y.

Figure 14:
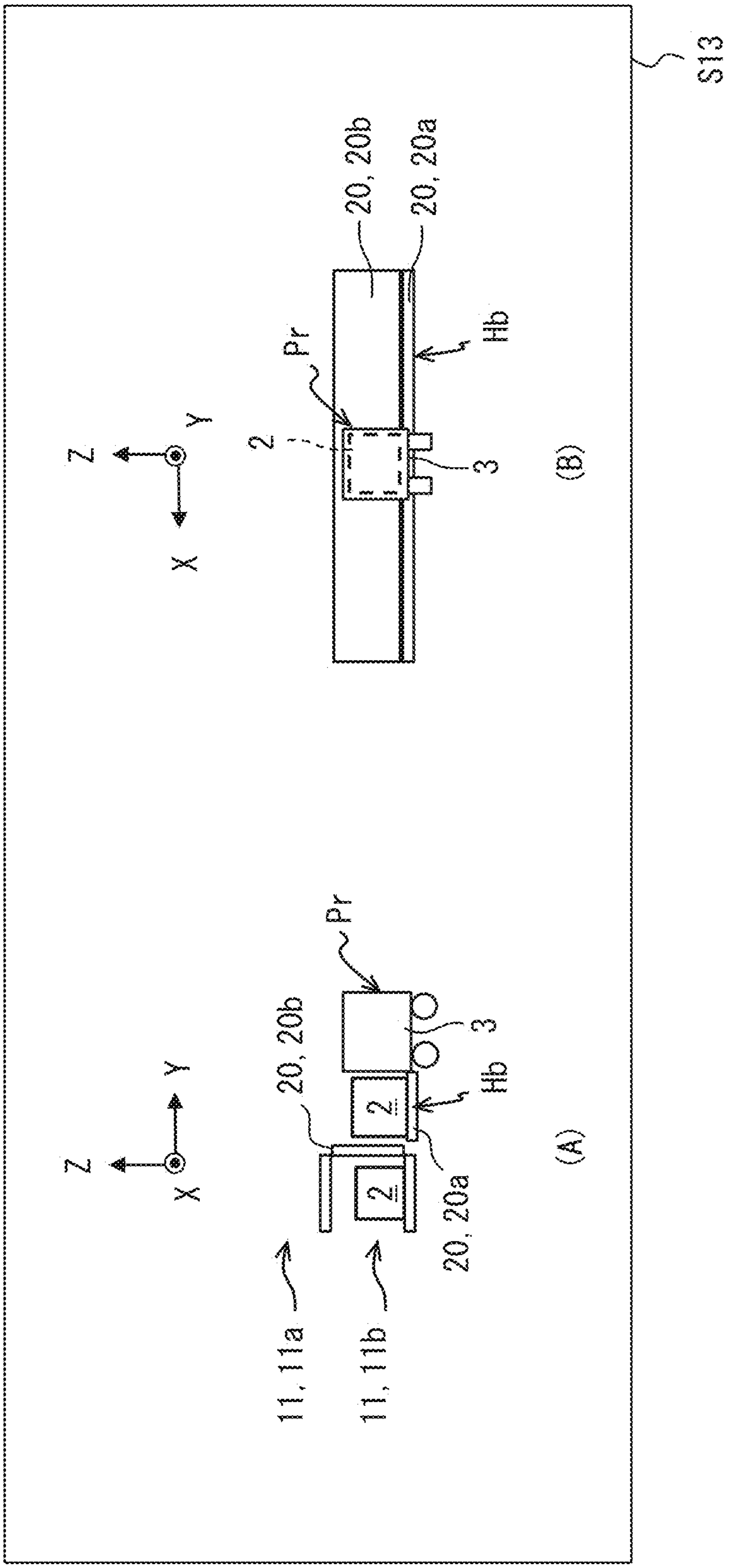
FIG. 14 is a diagram showing a cross-sectional view in (A) and a side view in (B) for an operation example of the transport system according to the first embodiment.
Figure 15:
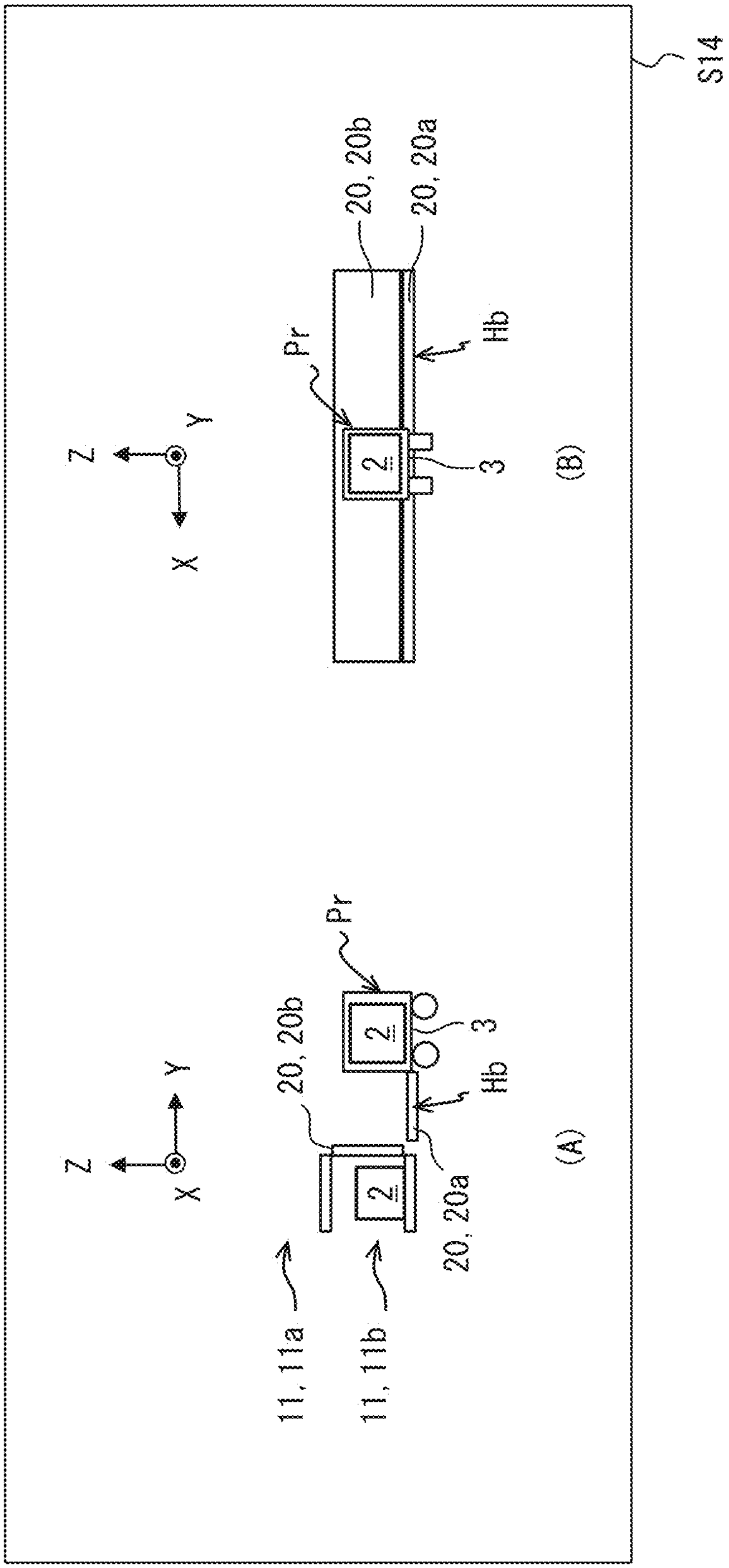
FIG. 15 is a diagram showing a cross-sectional view in (A) and a side view in (B) for an operation example of the transport system according to the first embodiment.

At S13 shown in FIG. 14, the control unit 60 controls the lift unit 40 to lift down the upper door unit 20*a*, which supports the luggage 2 retrieved from the luggage compartment 11 in the lateral direction Y to be in the open state, to the lowermost position Hb in the vertical direction Z. At S14 shown in FIG. 15, the control unit 60 controls the upper conveyor unit 30*a* at the lowermost position Hb to transfer the luggage 2 supported by the lifted-down upper door unit 20*a* in the open state to the transport robot 3 in the lateral direction Y.

Furthermore, when the luggage 2 loaded on the lower layer 11*b* in the luggage compartment 11 is transferred to the transport robot 3, the opening/closing unit 21 of the lower door unit 20*b*, the lower conveyor element 12*b*, and the lower conveyor unit 30*b* are controlled sequentially similar to S10 to S12 and S14.

(Operation and Effects)

The operation effects of the first embodiment will be described below.

According to the first embodiment, in a cargo vehicle 4, the door unit 20 is opened and closed in the lateral direction Y according to the control of the control unit 60 with respect to the container unit 10 accommodating the luggage 2 arranged in a longitudinal direction X, which is longer than a lateral direction Y. Therefore, when the conveyor unit 30 retrieves the plurality of pieces of the luggage 2 from the luggage compartment 11 in the lateral direction Y through the door unit 20 which is opened to transport the plurality of pieces of the luggage 2 to the transport robot 3, according to the control of the control unit 60, the transfer time can be shortened. Therefore, it is possible to automate the transfer of the luggage 2 from the cargo vehicle 4 to the transport robot 3, thereby improving efficiency.

According to the first embodiment, in a cargo vehicle 4, the control unit 60 controls the drive of the lift unit 40, which drives the door unit 20 in the height direction Z, with respect to the container unit 10 accommodating the luggage 2 arranged in a longitudinal direction X and a height direction Z in a luggage compartment 11. Then, the control unit 60 controls the lift unit 40 to lift down, in the vertical direction Z, the door unit 20 that supports the luggage 2 retrieved from the luggage compartment 11 in the lateral direction Y to be in the open state, and then controls the conveyor unit 30 to transfer the luggage 2 supported by the door unit 20 to the transport robot 3 in the lateral direction Y. According to this feature, it is possible to improve the efficiency of the transfer of the luggage 2 from the luggage compartment 11, which has an improved storage efficiency.

Second Embodiment

A second embodiment is a modification of the first embodiment.

Figure 16:
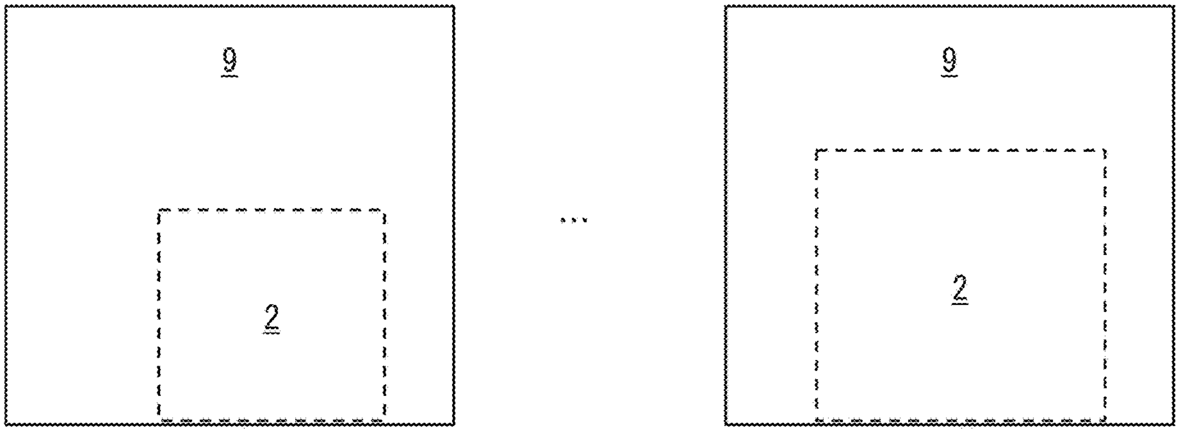
FIG. 16 is a schematic diagram showing a front view of a transport box used in the transport system according to a second embodiment.
Figure 17:
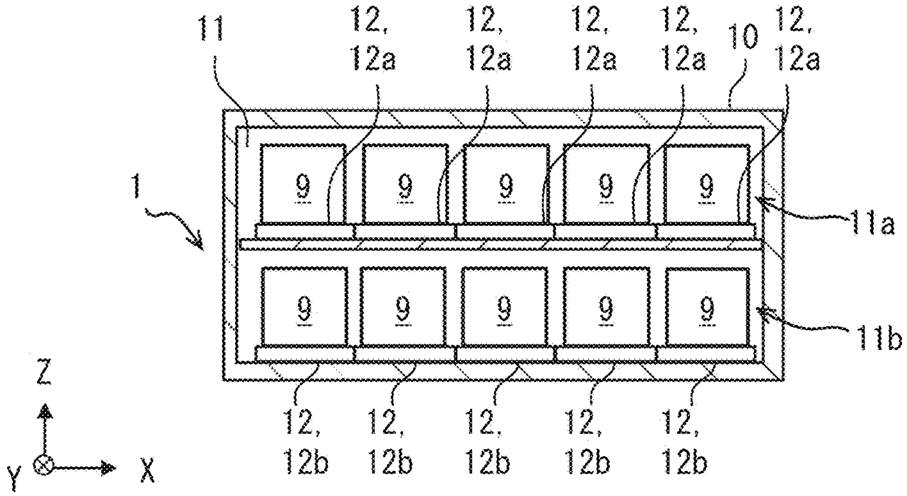
FIG. 17 is a schematic diagram showing a cross-sectional view of a transport system according to the second embodiment.
Figure 18:
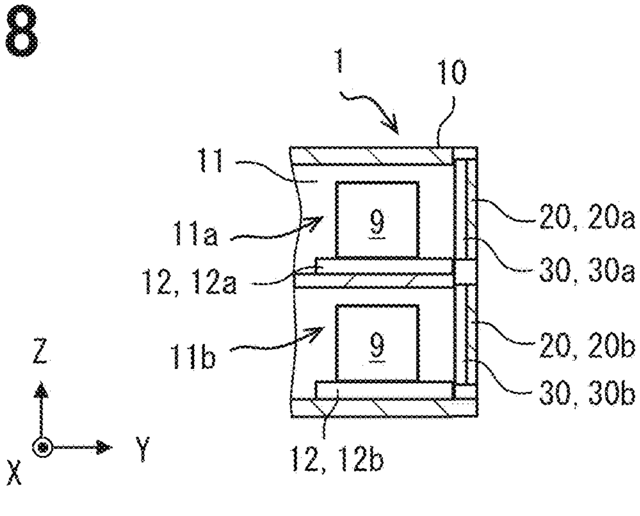
FIG. 18 is a schematic diagram showing a cross-sectional view of a transport system according to the second embodiment.
Figure 19:
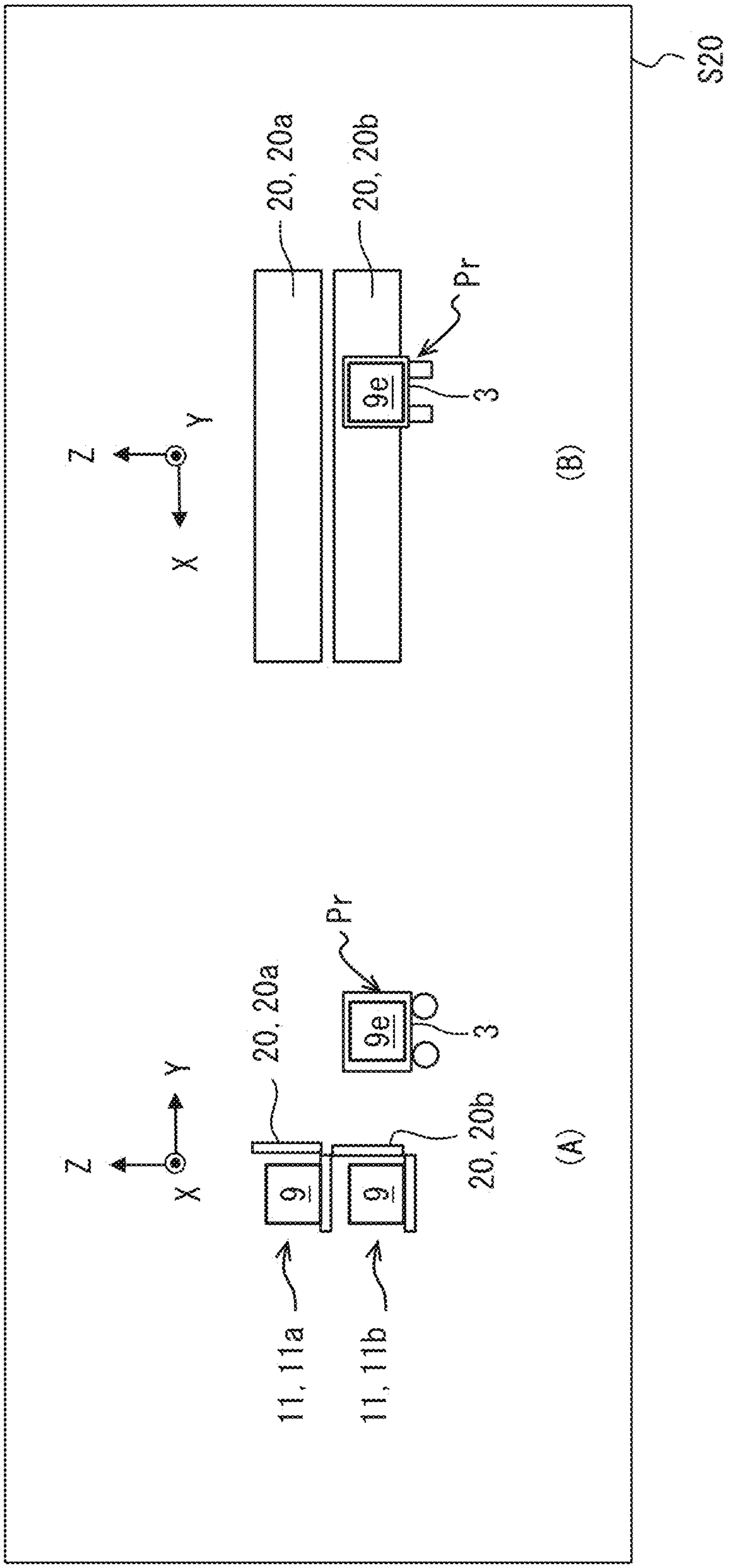
FIG. 19 is a diagram showing a cross-sectional view in (A) and a side view in (B) for an operation example of the transport system according to the second embodiment.

As shown in FIG. 16, in the second embodiment, each piece of the luggage 2 is individually accommodated in a rectangular hollow transport box 9 formed to substantially the same specified size. Therefore, as shown in FIGS. 17 and 18, each transport box 9 accommodating an individual piece of the luggage 2 can be accommodated in the luggage compartment 11 with multiple transport boxes lined up in the longitudinal direction X on each layer 11*a*, 11*b*. In response to this feature, the conveyor unit 30 (i.e., 30*a*, 30*b*) on the respective door units 20 (i.e., 20*a*, 20*b*) are controlled by the control unit 60 so as to be able to displace the transport box 9 in both the lateral direction Y and the longitudinal direction X.

In accordance with the utilization of the transport box 9, the transport robot 3 retrieves the luggage 2 from the transport box 9 accommodated in the accommodation unit 8, and then, moves to the stopping position of the same or a different cargo vehicle 4, thereby transferring the empty transport box 9 (hereinafter, represented as 9*e* as in FIGS. 19 to 27) to the transport system 1. Therefore, the transport robot 3 has a built-in belt conveyor having the configuration similar to the conveyor element 12 or a built-in ball conveyor having the configuration similar to the conveyor unit 30 as a transfer unit.

An operation example of the transport system 1 that operates under the control of the control unit 60 in the second embodiment will be described. The operation example of the second embodiment shown in FIGS. 19 to 27 is an illustration of transferring a transport box 9 loaded with the luggage 2 accommodated therein on the upper layer 11*a* in the luggage compartment 11 to a transport robot 3, while retrieving an empty transport box 9*e* from the transport robot 3. Therefore, at S20 shown in FIG. 19, the transport robot 3 arrives at a transfer position Pr in the longitudinal direction X, where an empty transport box 9*e* can be exchanged for a transport box 9 that accommodates the luggage 2, and stops for the exchange. At this time, the transfer position Pr can be set to any position in the longitudinal direction X.

Figure 20:
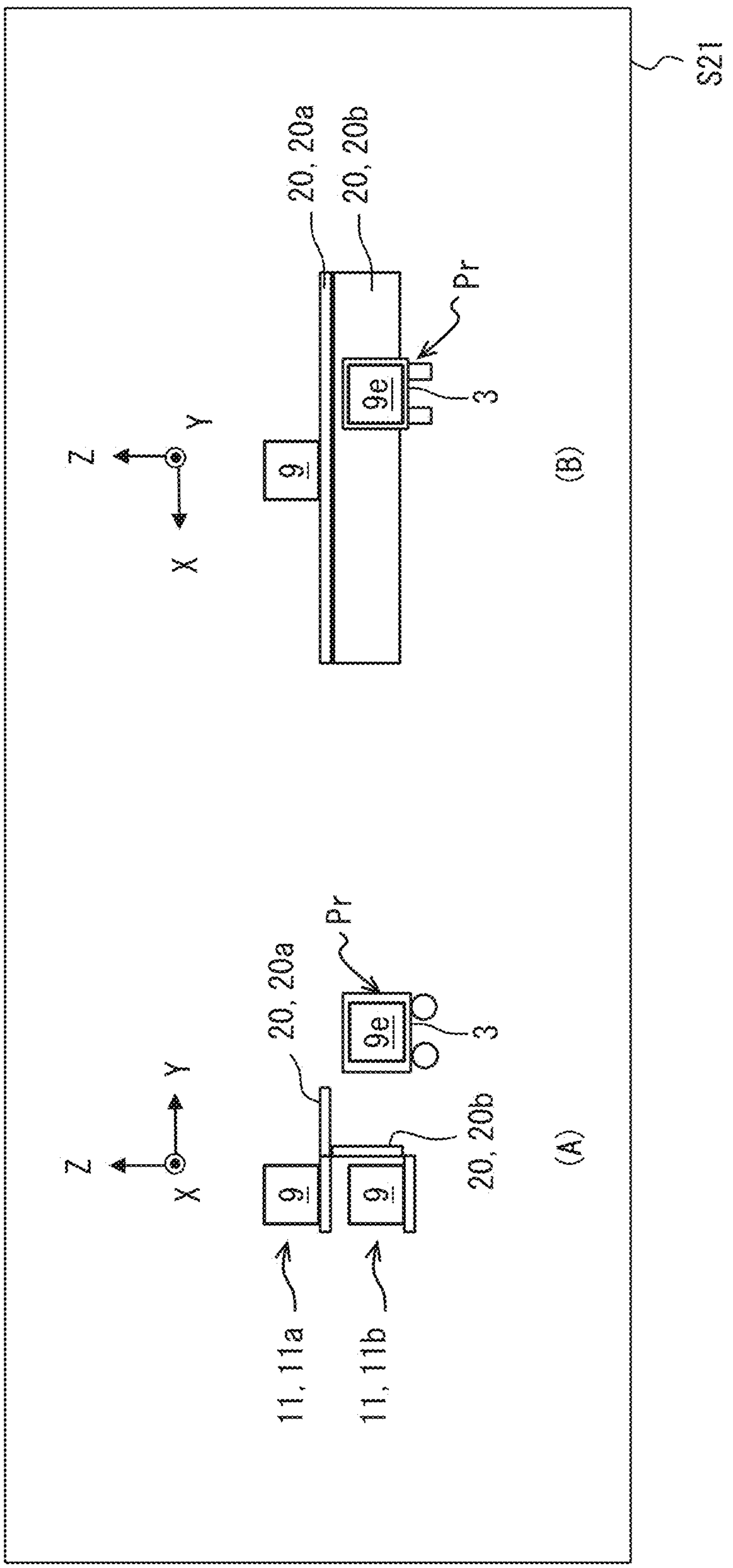
FIG. 20 is a diagram showing a cross-sectional view in (A) and a side view in (B) for an operation example of the transport system according to the second embodiment.
Figure 21:
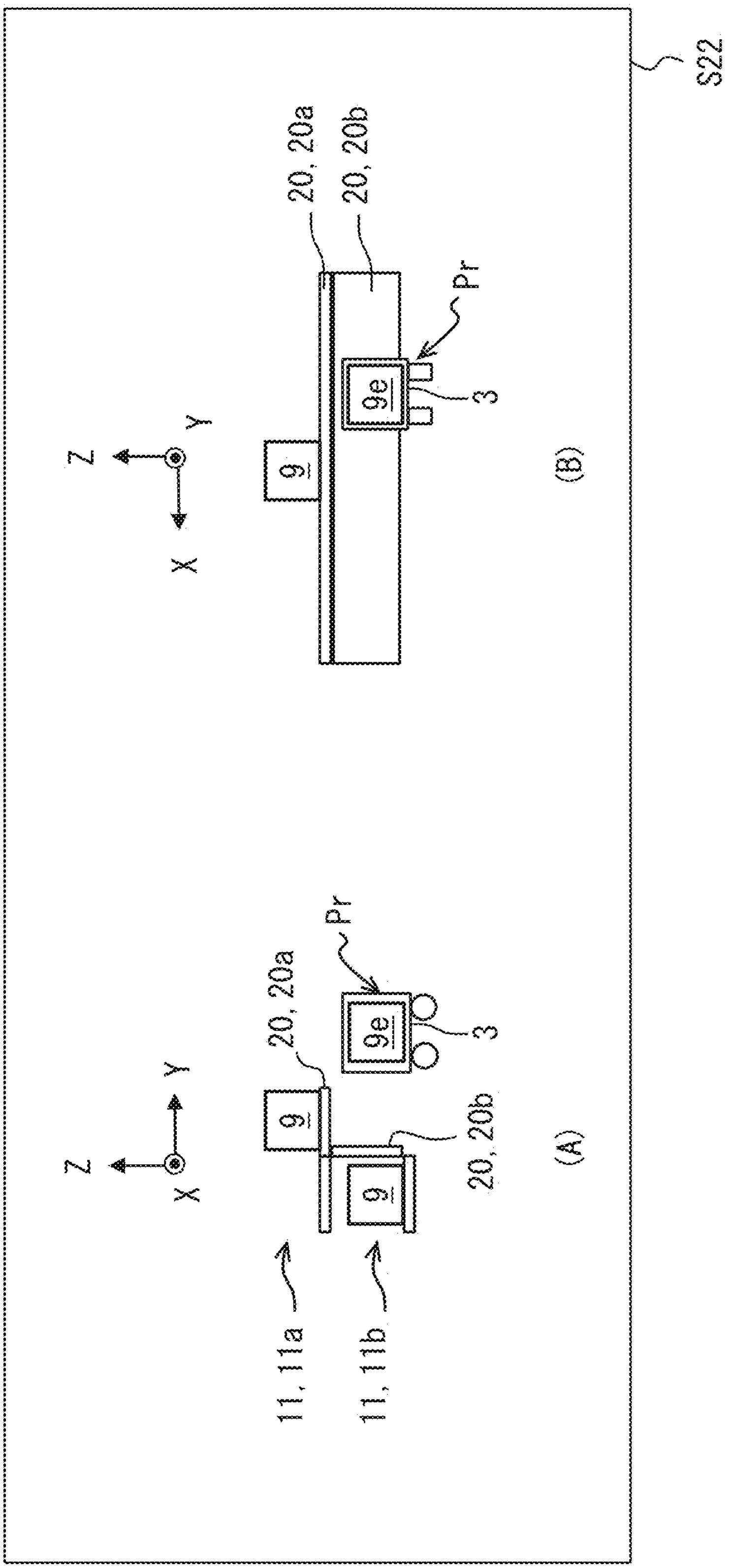
FIG. 21 is a diagram showing a cross-sectional view in (A) and a side view in (B) for an operation example of the transport system according to the second embodiment.

At S21 shown in FIG. 20, the control unit 60 controls the opening/closing unit 21 of the upper door unit 20*a* as an opening target door unit so as to open the upper door unit 20*a* in the lateral direction Y. At S22 shown in FIG. 21, the control unit 60 controls the upper conveyor element 12*a*, on which the transport box 9 is loaded, together with the upper conveyor unit 30*a* so as to retrieve the transport box 9 accommodating the luggage 2 in the lateral direction Y from the upper layer 11*a* in the luggage compartment 11.

Figure 22:
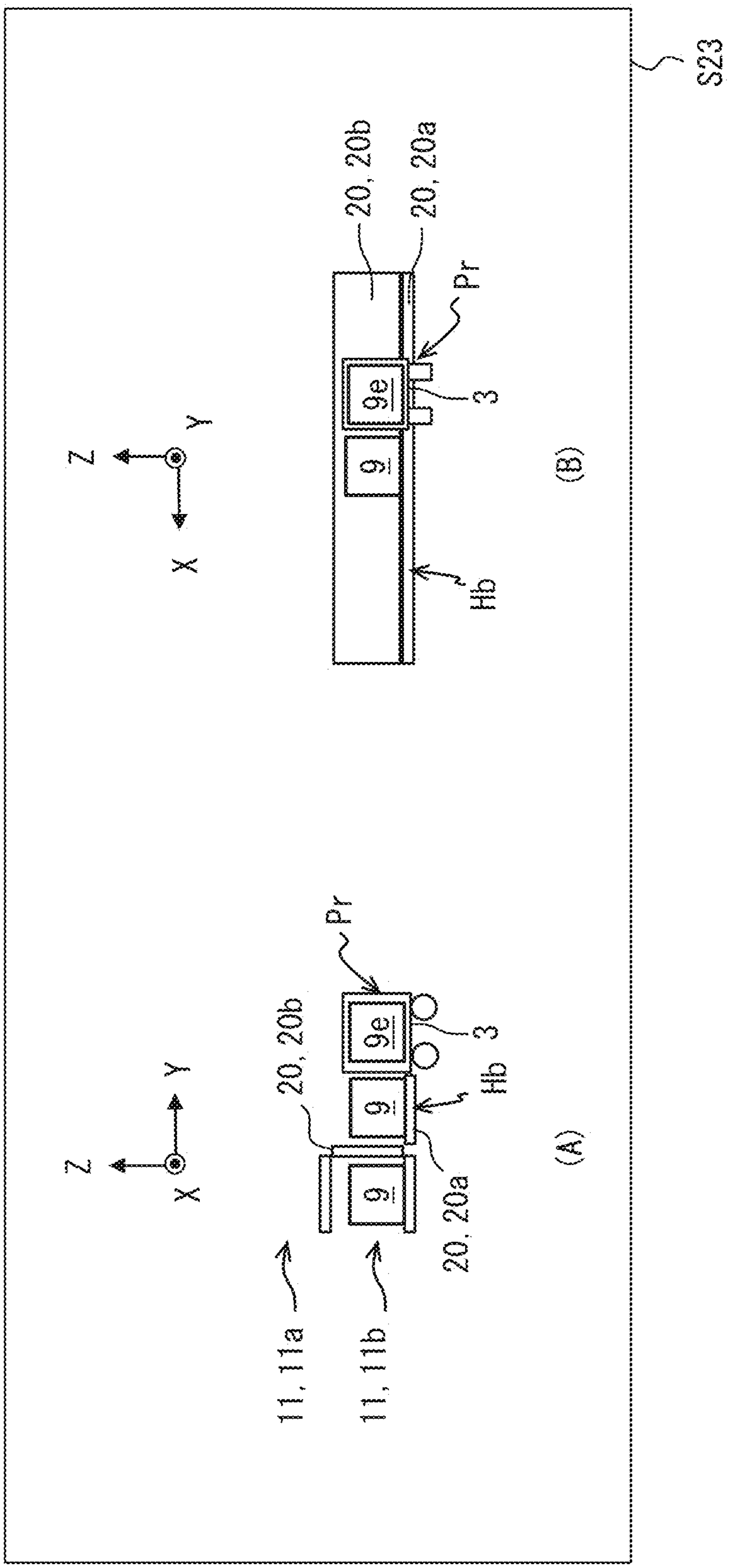
FIG. 22 is a diagram showing a cross-sectional view in (A) and a side view in (B) for an operation example of the transport system according to the second embodiment.
Figure 23:
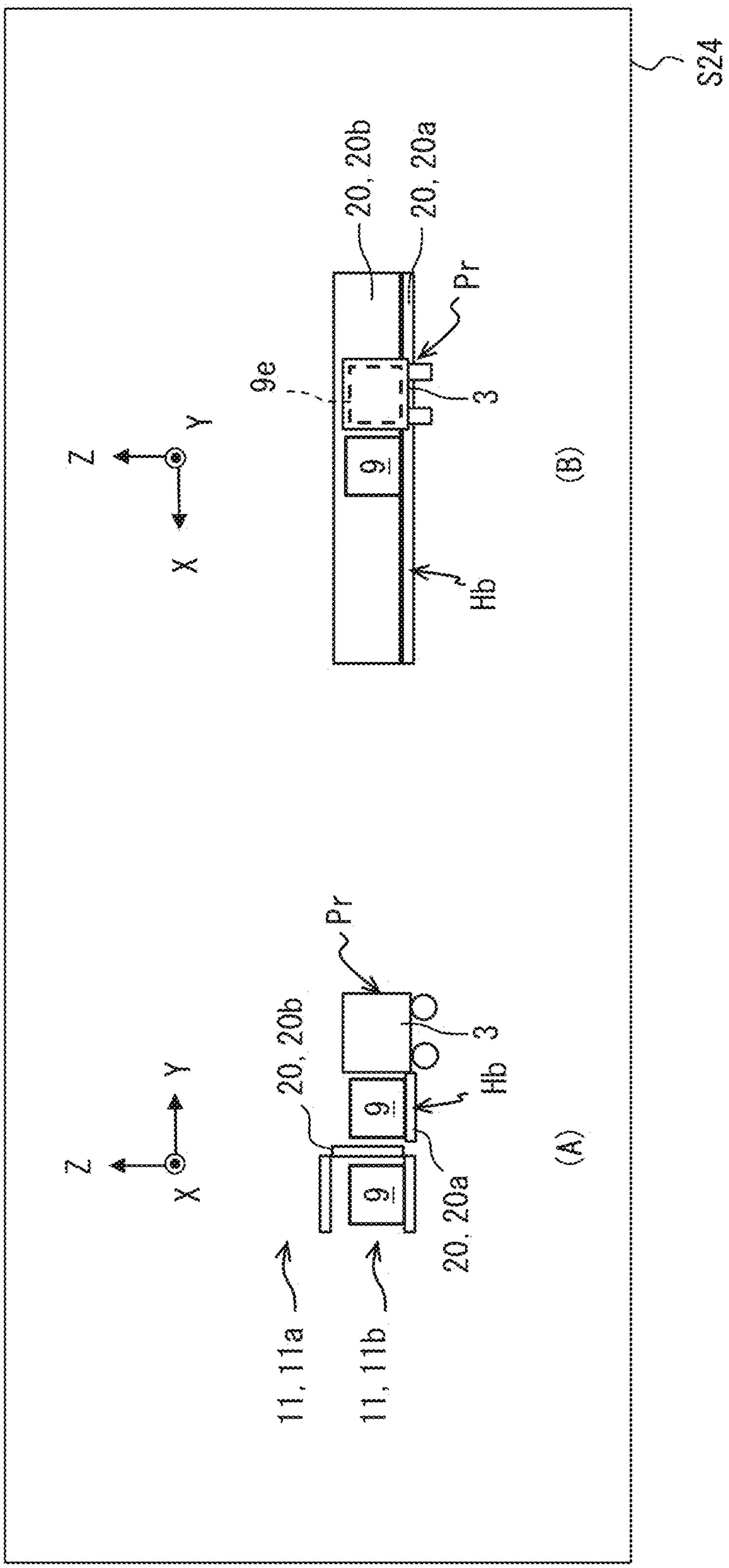
FIG. 23 is a diagram showing a cross-sectional view in (A) and a side view in (B) for an operation example of the transport system according to the second embodiment.

At S23 shown in FIG. 22, the control unit 60 controls the lift unit 40 to lift down the upper door unit 20*a*, which supports the transport box 9 accommodating the luggage 2 removed from the luggage compartment 11 in the lateral direction Y in the open state before shifting the transport box 9 at S25 (described later), to the lowermost position Hb in the height direction Z. At S24 shown in FIG. 23, the control unit 60 controls the upper conveyor unit 30*a* at the lowermost position Hb to receive the transport box 9*e*, which has been emptied after transporting the luggage 2, in the lateral direction Y from the transport robot 3 at the transfer position Pr. At this time, the control unit of the transport robot 3 controls the transfer unit to transfer the transport box 9*e* to the upper conveyor unit 30*a* in the lateral direction Y by synchronizing with the control of the control unit 60 through communication.

Figure 24:
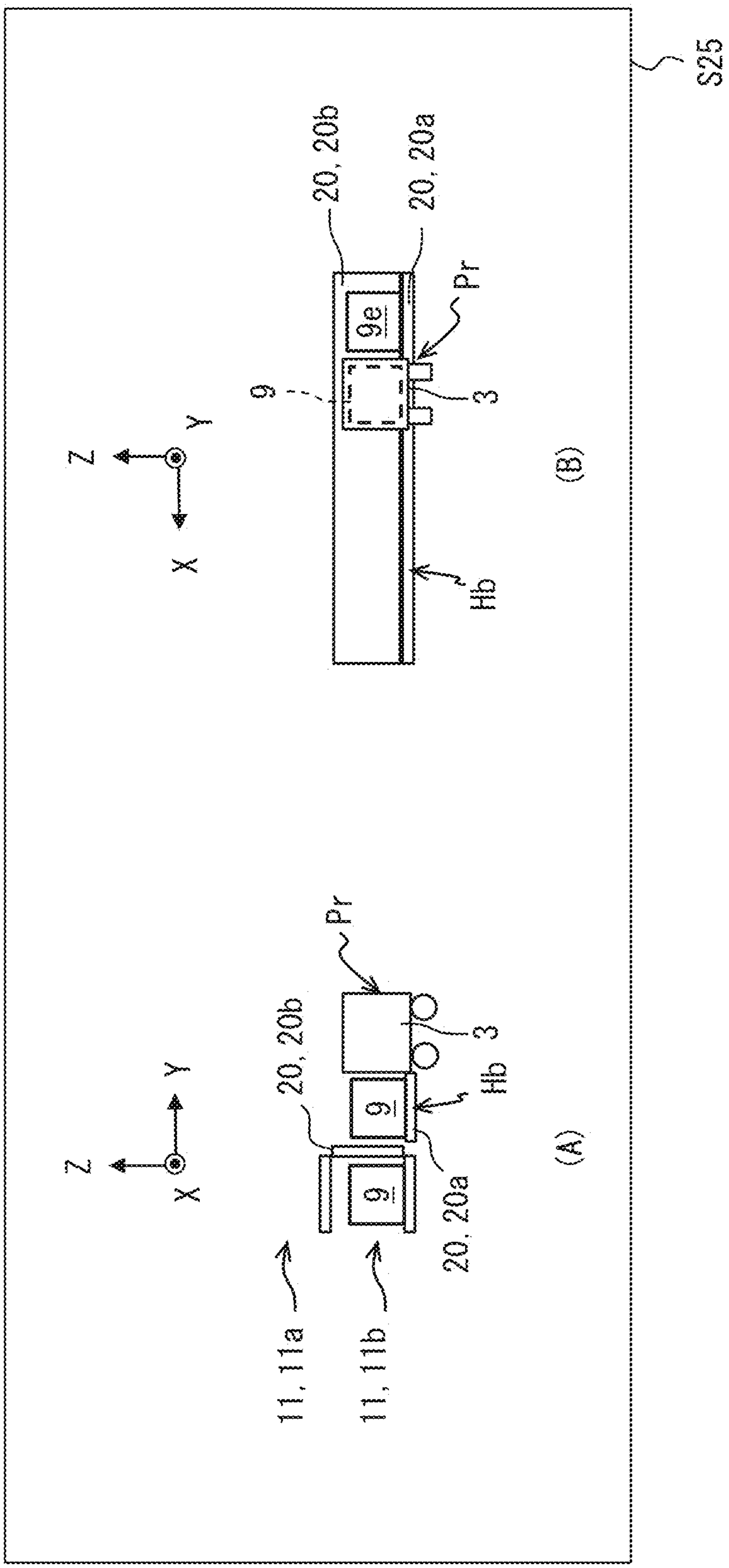
FIG. 24 is a diagram showing a cross-sectional view in (A) and a side view in (B) for an operation example of the transport system according to the second embodiment.

At S25 shown in FIG. 24, the control unit 60 controls the upper conveyor unit 30*a* at the lowermost position Hb to shift both the transport box 9 accommodating the luggage 2 that has been retrieved from the luggage compartment 11 in the lateral direction Y and lifted down, and the empty transport box 9*e* that has been received in the lateral direction Y from the transport robot 3, in the longitudinal direction X. At this time, the shift in the longitudinal direction X is controlled so that the transport box 9 accommodating the luggage 2 moves to the transfer position Pr.

Figure 25:
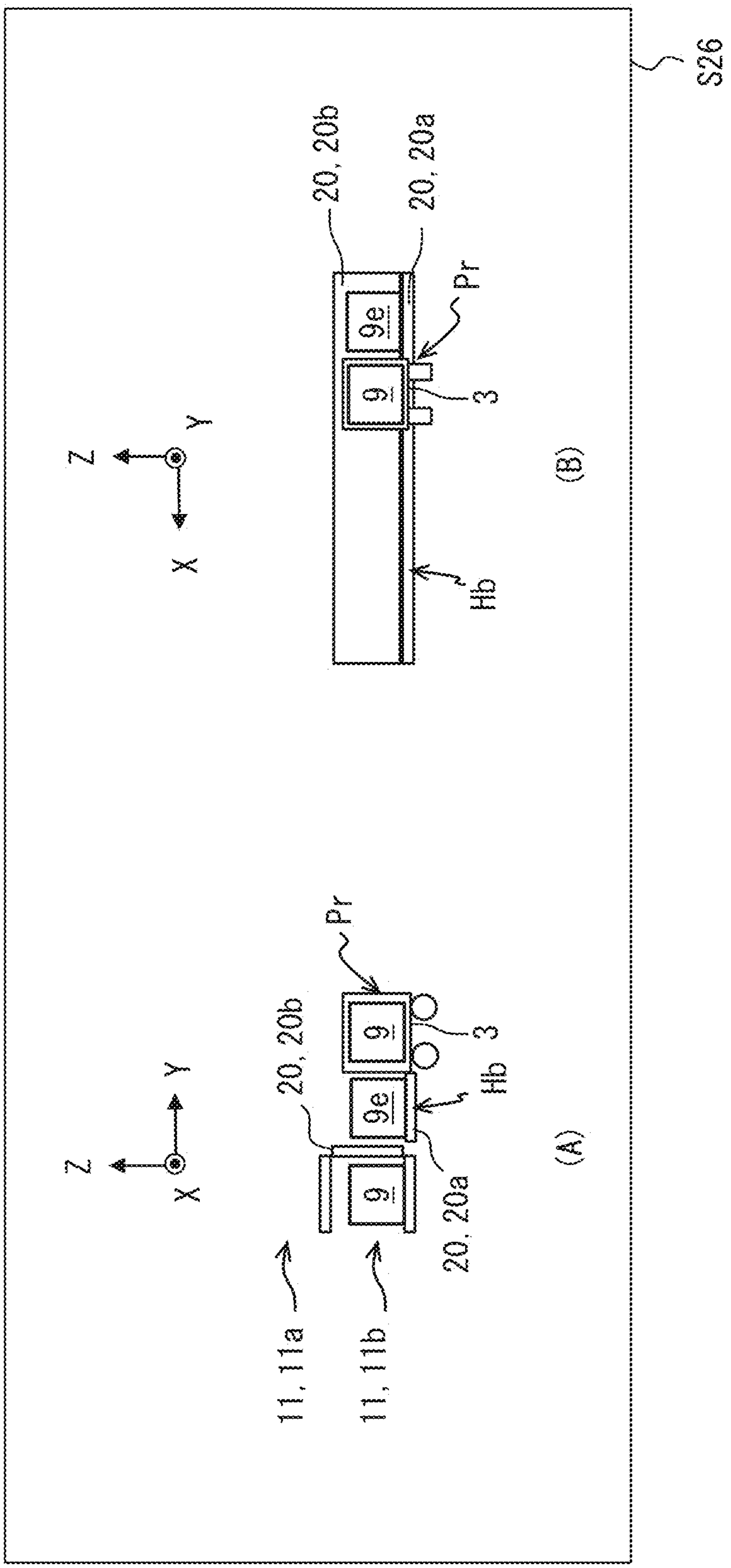
FIG. 25 is a diagram showing a cross-sectional view in (A) and a side view in (B) for an operation example of the transport system according to the second embodiment.

At S26 shown in FIG. 25, the control unit 60 controls the upper conveyor unit 30*a* at the lowermost position Hb so that the transport box 9, after being shifted in the longitudinal direction X while being supported by the upper door unit 20*a* lifted-down in the open state, is transferred to the transport robot 3 in the lateral direction Y with accommodating the luggage 2 therein. At this time, the control unit of the transport robot 3 may synchronize with the control of the control unit 60 via communication to control the transfer unit to receive the transport box 9 accommodating the luggage 2 from the upper conveyor unit 30*a* in the lateral direction Y, thereby improving the transfer efficiency.

Figure 26:
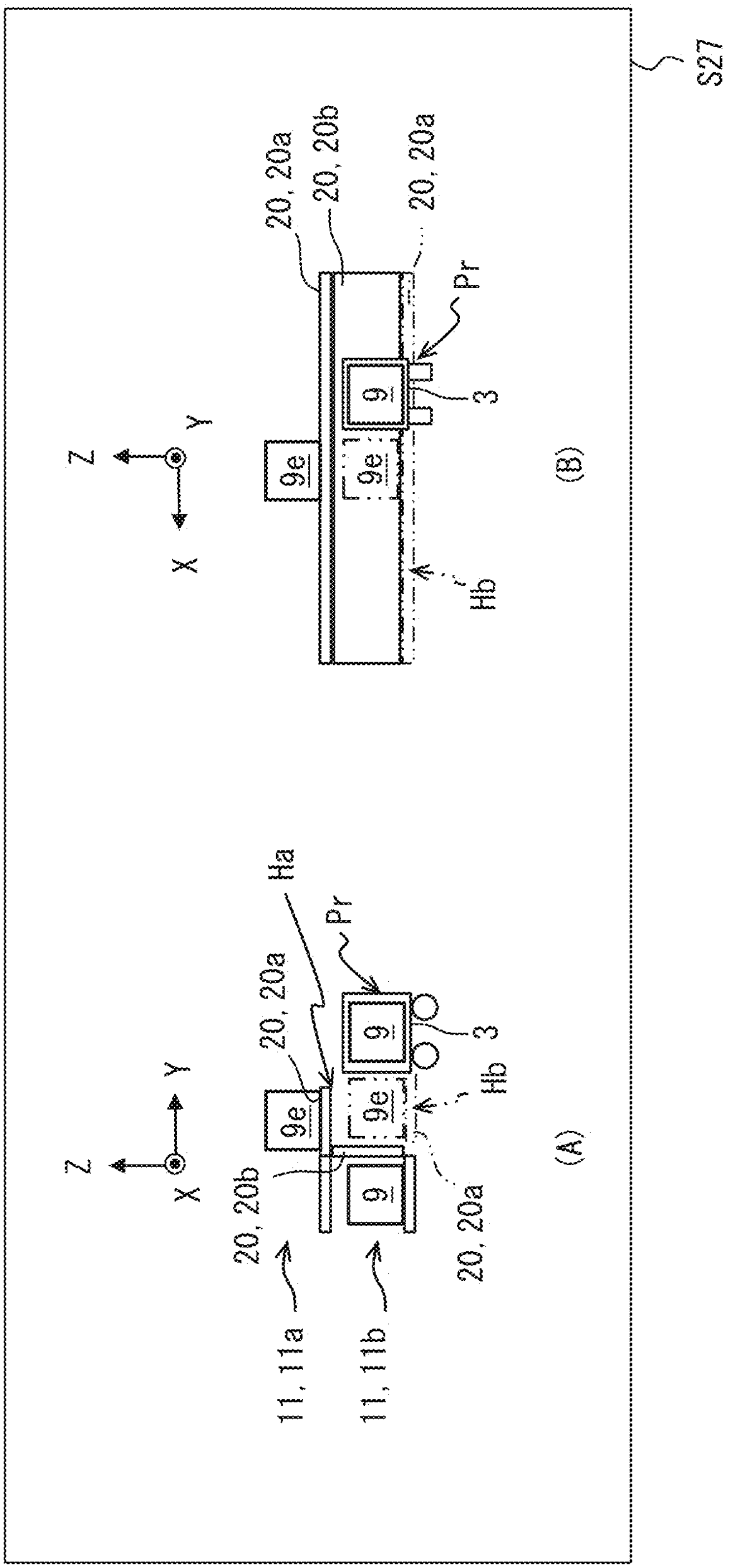
FIG. 26 is a diagram showing a cross-sectional view in (A) and a side view in (B) for an operation example of the transport system according to the second embodiment.

At S27 shown in FIG. 26, the control unit 60 controls the upper conveyor unit 30*a* to reverse the empty transport box 9*e* after received from the transport robot 3 in the lateral direction Y and shifted in the longitudinal direction X, toward the opposite direction to the shift direction in the longitudinal direction X, as shown by the two-dot chain line in FIG. 26. At the same time, at S27, the control unit 60 controls the lift unit 40 to lift up the upper door unit 20*a*, which supports the empty transport box 9*e* in the open state after the empty transport box 9*e* is received in the lateral direction Y from the transport robot 3 and shifted in the longitudinal direction X, from the lowermost position Hb to the uppermost position Ha in the height direction Z, as shown by the solid line in FIG. 26. The reverse operation and the lift-up operation are controlled so that one of them is performed after the other of them. Here, FIG. 26 shows a case where the reverse operation and the lift-up operation are performed in this order.

Figure 27:
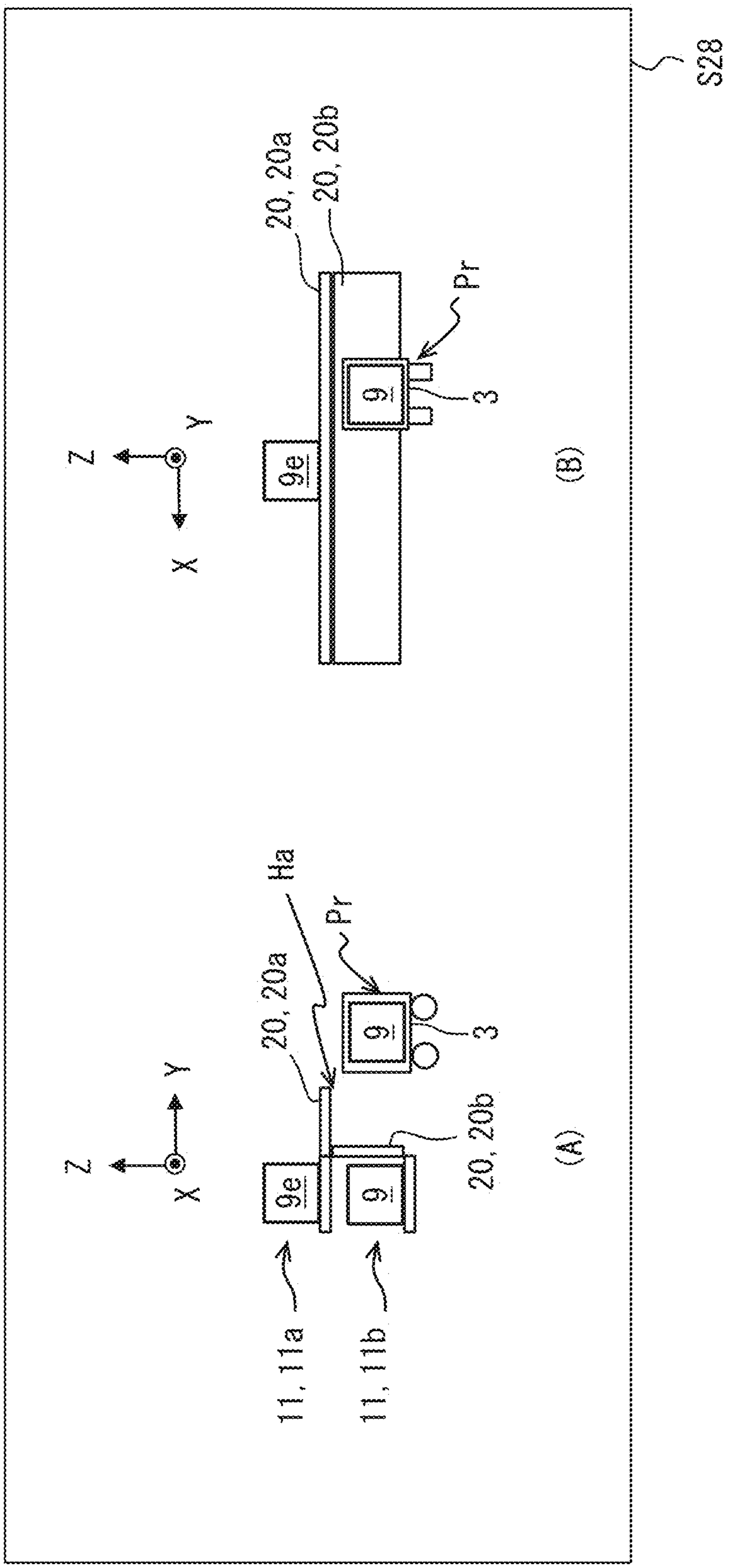
FIG. 27 is a diagram showing a cross-sectional view in (A) and a side view in (B) for an operation example of the transport system according to the second embodiment.

At S28 shown in FIG. 27, the control unit 60 controls the upper conveyor unit 30*a* at the uppermost position Ha so as to retrieve the empty transport box 9*e* after performing the reverse operation and the lift-up operation in the predetermined order, either in this order or the opposite order, to the upper layer 11*a* in the luggage compartment 11 in the lateral direction Y. At this time, the control unit 60 may also control the upper conveyor element 12*a* corresponding to the retrieve destination of the transport box 9*e*, thereby improving the retrieve efficiency.

Furthermore, when a transport box 9 loaded with the luggage 2 accommodated on the lower layer 11*b* in the luggage compartment 11 is transferred to the transport robot 3, and an empty transport box 9*e* is retrieved from the transport robot 3, the opening/closing unit 21 of the lower door unit 20*b*, the lower conveyor element 12*b*, and the lower conveyor unit 30*b* are controlled sequentially similar to S20 to S22, S24 to S26, the reverse operation of S27, and S28.

(Operation and Effects)

The operation and effect of the second embodiment described above will be described below.

The container unit 10 according to the second embodiment accommodates the luggage 2 in a transport box 9 having a specified size and accommodates the container unit 10 in the luggage compartment 11, so that it is possible to increase the accommodation efficiency of multiple pieces of the luggage 2 and therefore to increase the transport efficiency.

The conveyor unit 30 according to the second embodiment is configured to be able to displace the luggage 2 accommodated in the transport box 9 in both the lateral direction Y and the longitudinal direction X, and the displacement in each of the lateral direction Y and the longitudinal direction X is controlled by the control unit 60. According to this feature, the conveyor unit 30 not only retrieves the luggage 2 from the luggage compartment 11 in the lateral direction Y, but also displaces the luggage 2 in the longitudinal direction X to the transfer position Pr for the transport robot 3, according to the control of the control unit 60, thereby it is possible to improve the efficiency of the transfer.

In the second embodiment, the control unit 60 controls the conveyor unit 30 to shift the luggage 2 accommodated in the transport box 9, which is retrieved from the luggage compartment 11 in the lateral direction Y, in the longitudinal direction X to the transfer position Pr for the transport robot 3 that has stopped for receipt. Therefore, the control unit 60 can control the conveyor unit 30 to transfer the luggage 2 that has been shifted to the transfer position Pr to the transport robot 3 in the lateral direction Y, thereby it is possible to improve the efficiency of the transfer.

The control unit 60 in the second embodiment controls the conveyor unit 30 to retrieve the transport box 9 accommodating the luggage 2 from the luggage compartment 11 in the lateral direction Y, and to receive the transport box 9*e* after the luggage 2 has been transported from the transport box 9*e*, from the transport robot 3 in the lateral direction Y. Therefore, the control unit 60 controls the conveyor unit 30 to shift in the longitudinal direction X both the transport box 9 retrieved in the lateral direction Y from the luggage compartment 11 and the transport box 9*e* received in the lateral direction Y from the transport robot 3. Furthermore, the control unit 60 controls the conveyor unit 30 to transfer the transport box 9, after the transport box 9 has been retrieved from the luggage compartment 11 in the lateral direction Y and shifted in the longitudinal direction X, to the transport robot 3 in the lateral direction Y, and to retrieve the transport box 9*e*, after the transport box 9*e* has been received from the transport robot 3 in the lateral direction Y and shifted in the longitudinal direction X, to the luggage compartment 11 in the lateral direction Y. This series of controls makes it possible to efficiently not only transfer the luggage 2 using the transport box 9, but also to efficiently retrieve the transport box 9*e* that has become empty after the luggage 2 has been transported.

According to the second embodiment, in a cargo vehicle 4, the control unit 60 controls the drive of the lift unit 40, which drives the door unit 20 in the height direction Z, with respect to the container unit 10 accommodating the transport box 9 to be arranged in a longitudinal direction X and a height direction Z in a luggage compartment 11. The control unit 60 then controls the lift unit 40 to lift down, in the height direction Z, the door unit 20 that supports the transport box 9 in the open state before the transport box 9 is shifted in the longitudinal direction X after being retrieved from the cargo compartment 11 in the lateral direction Y, and then transfers the transport box 9, after the transport box 9 is shifted, to the transport robot 3. This makes it possible to efficiently transfer the luggage 2 from the luggage compartment 11, which has improved accommodation efficiency, using the transport box 9.

The control unit 60 in the second embodiment controls the conveyor unit 30 to reverse the transport box 9*e* in the longitudinal direction X after the transport box 9*e* is received from the transport robot 3 in the lateral direction Y and shifted in the longitudinal direction X, and also controls the lift unit 40 to lift up, in the longitudinal direction X, the door unit 20 supporting the shifted transport box 9*e* in an open state. Therefore, the control unit 60 controls the conveyor unit 30 to retrieve the transport box 9 into the luggage compartment 11 in the lateral direction Y after performing the reverse operation and the lift-up operation in a predetermined order, either in this order or the opposite order, thereby it is possible to promote the efficiency of retrieving the transport box 9.

Third Embodiment

A third embodiment is a modification of the second embodiment.

Figure 28:
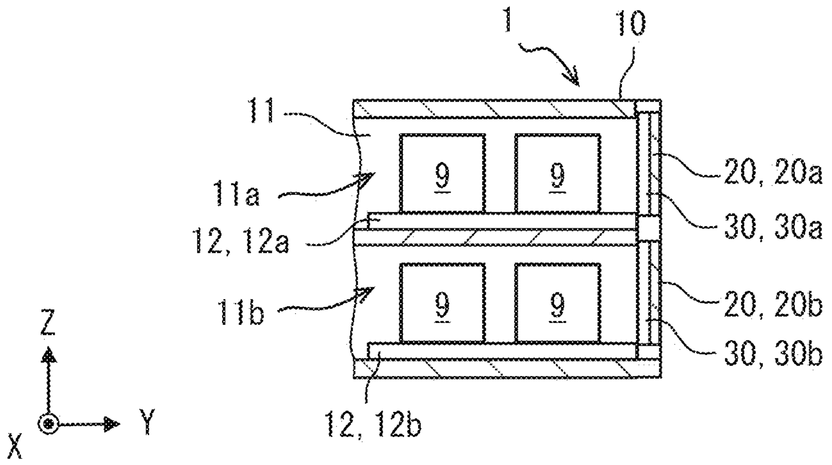
FIG. 28 is a schematic diagram showing a cross-sectional view of a transport system according to a third embodiment.
Figure 29:
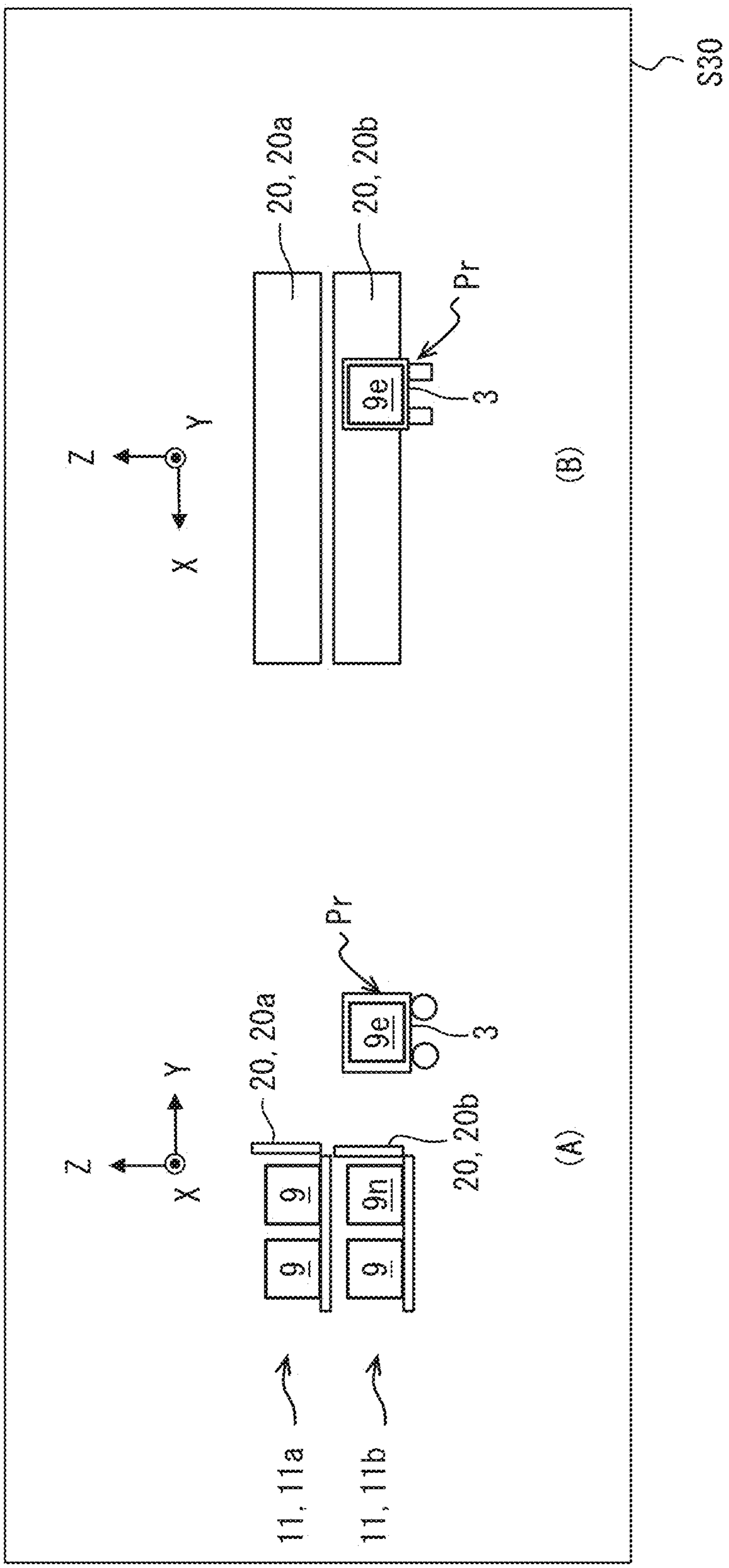
FIG. 29 is a diagram showing a cross-sectional view in (A) and a side view in (B) for an operation example of the transport system according to the third embodiment.

As shown in FIG. 28, in the third embodiment, each piece of the luggage 2 can be accommodated in the luggage compartment 11 on each layer 11*a*, 11*b* to arrange multiple pieces of the luggage 2 not only in the longitudinal direction X as in the second embodiment but also in the lateral direction Y as shown in FIG. 28 under a condition that each piece of the luggage 2 is accommodated in an individual transport box 9. In response to this feature, the conveyor unit 30 (i.e., 30*a*, 30*b*) on the respective door units 20 (i.e., 20*a*, 20*b*) are controlled by the control unit 60 so as to be able to displace the transport box 9 in both the lateral direction Y and the longitudinal direction X also in the third embodiment.

An operation example of the transport system 1 that operates under the control of the control unit 60 in the third embodiment will be described. The operation example of the third embodiment shown in FIGS. 29 to 39 is an example of a process such that the transport box 9 as a transfer target is transferred to the transport robot 3 under a condition that the transport box 9 (hereinafter, referred to as 9*n* as in FIGS. 29 to 39), which is not the transfer target, is loaded on the lowermost door unit 20*b* side in the lateral direction Y on the lower layer 11*b* in the luggage compartment 11. Therefore, at S30 shown in FIG. 29, the transport robot 3 arrives at a transfer position Pr in the longitudinal direction X, where an empty transport box 9*e* can be exchanged for a transport box 9 as the transfer target, and stops for the exchange.

Figure 30:
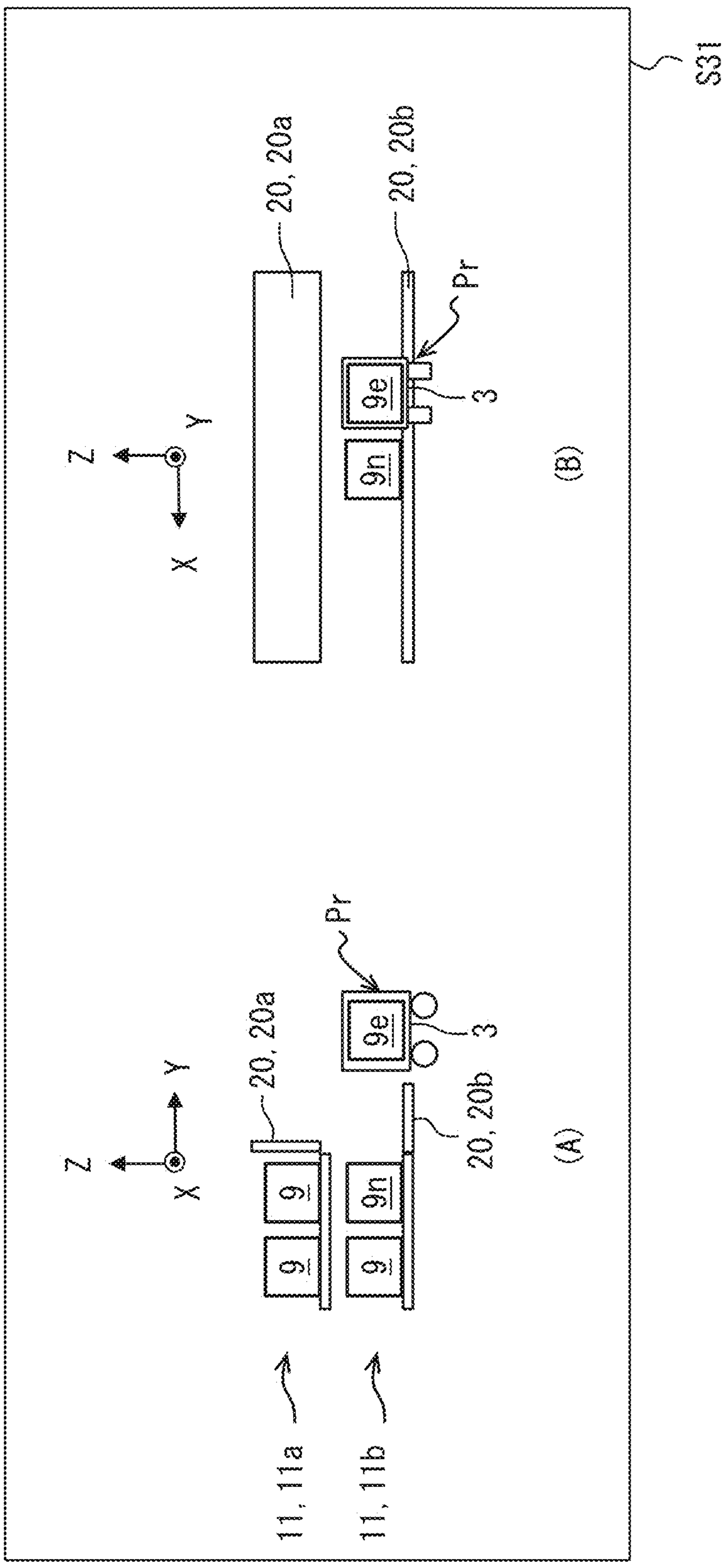
FIG. 30 is a diagram showing a cross-sectional view in (A) and a side view in (B) for an operation example of the transport system according to the third embodiment.
Figure 31:
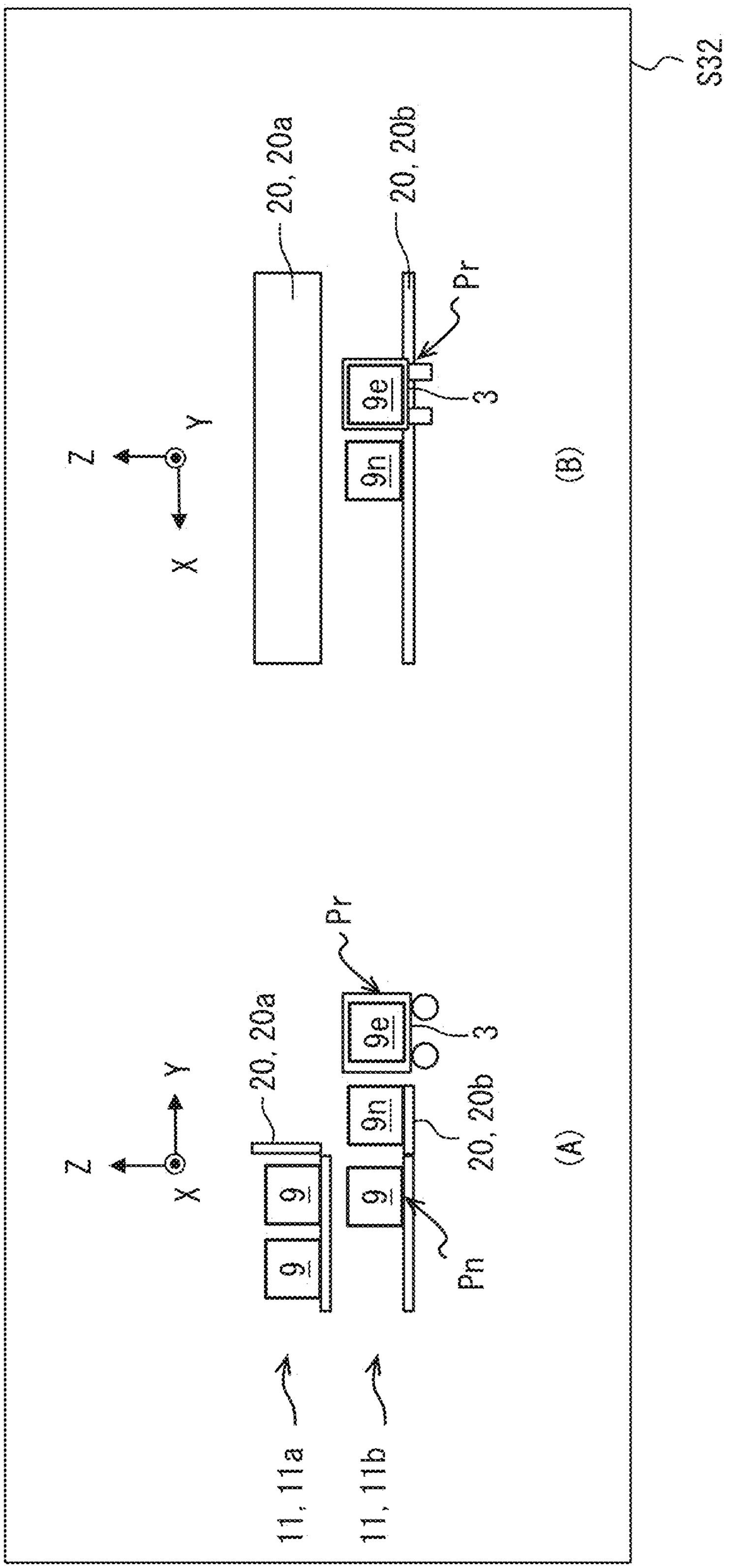
FIG. 31 is a diagram showing a cross-sectional view in (A) and a side view in (B) for an operation example of the transport system according to the third embodiment.

At S31 shown in FIG. 30, the control unit 60 controls the opening/closing unit 21 of the lower door unit 20*b* as an opening target door unit so as to open the lower door unit 20*b* in the lateral direction Y. In S32 shown in FIG. 31, the control unit 60 controls the lower conveyor unit 12*b*, on which the transport box 9*n* is loaded, together with the lower conveyor unit 30*b* so as to retrieve the transport box 9*n* which is not the transfer target from the lower layer 11*b* in the luggage compartment 11 in the lateral direction Y. At this time, the transport box 9 as the transfer target is displaced to the loading position Pn before the transport box 9*n* which is not the transfer target is retrieved in the lateral direction Y under the control of the lower conveyor unit 12*b*.

Figure 32:
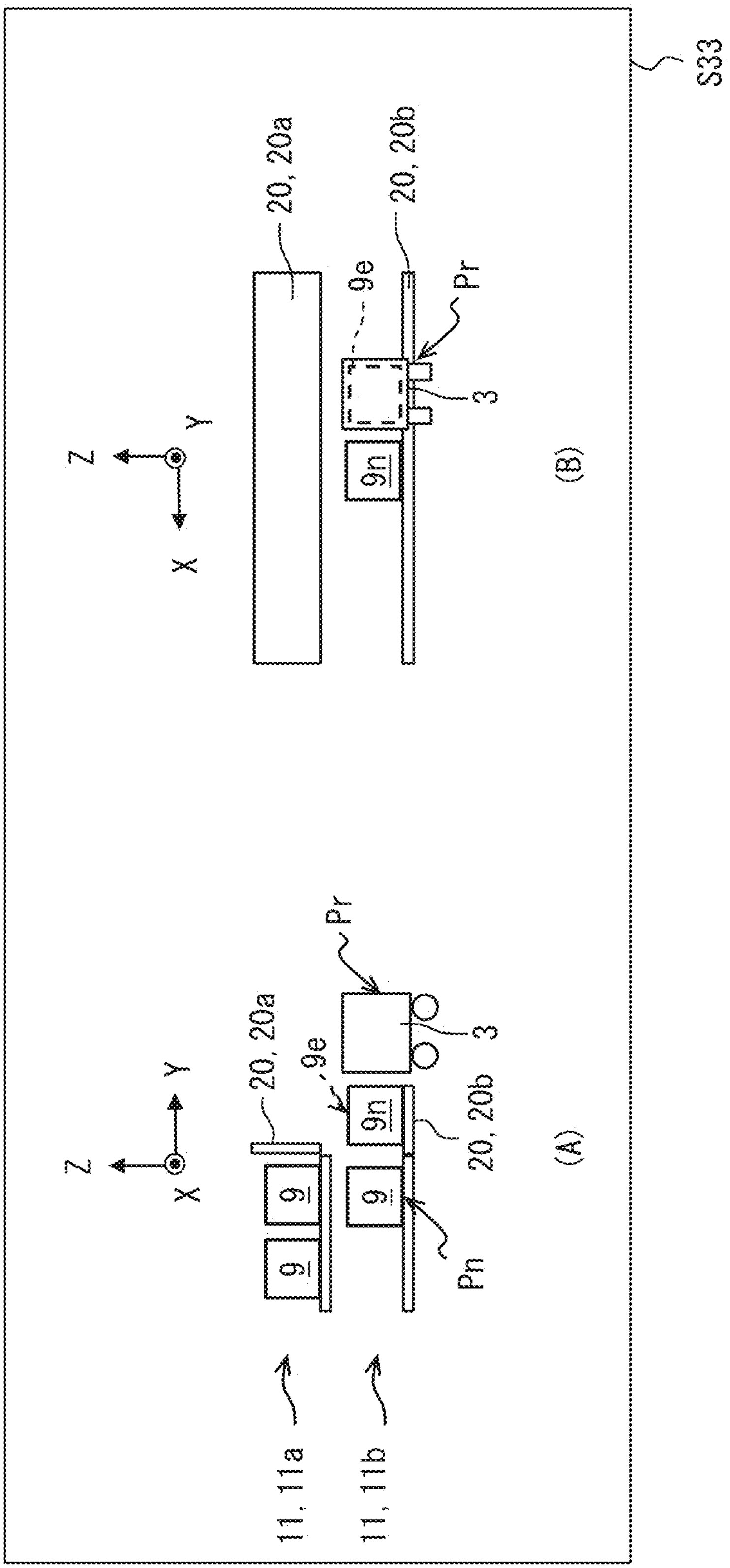
FIG. 32 is a diagram showing a cross-sectional view in (A) and a side view in (B) for an operation example of the transport system according to the third embodiment.

At S33 shown in FIG. 32, the control unit 60 controls the lower conveyor unit 30*b* to receive the transport box 9*e*, which has been emptied after the luggage 2 was transported, from the transport robot 3 in the lateral direction Y. At this time, the control unit of the transport robot 3 controls the transfer unit to transfer the transport box 9*e* to the lower conveyor unit 30*b* in the lateral direction Y by synchronizing with the control of the control unit 60 through communication. S33 may be performed prior to or simultaneously with S32.

Figure 33:
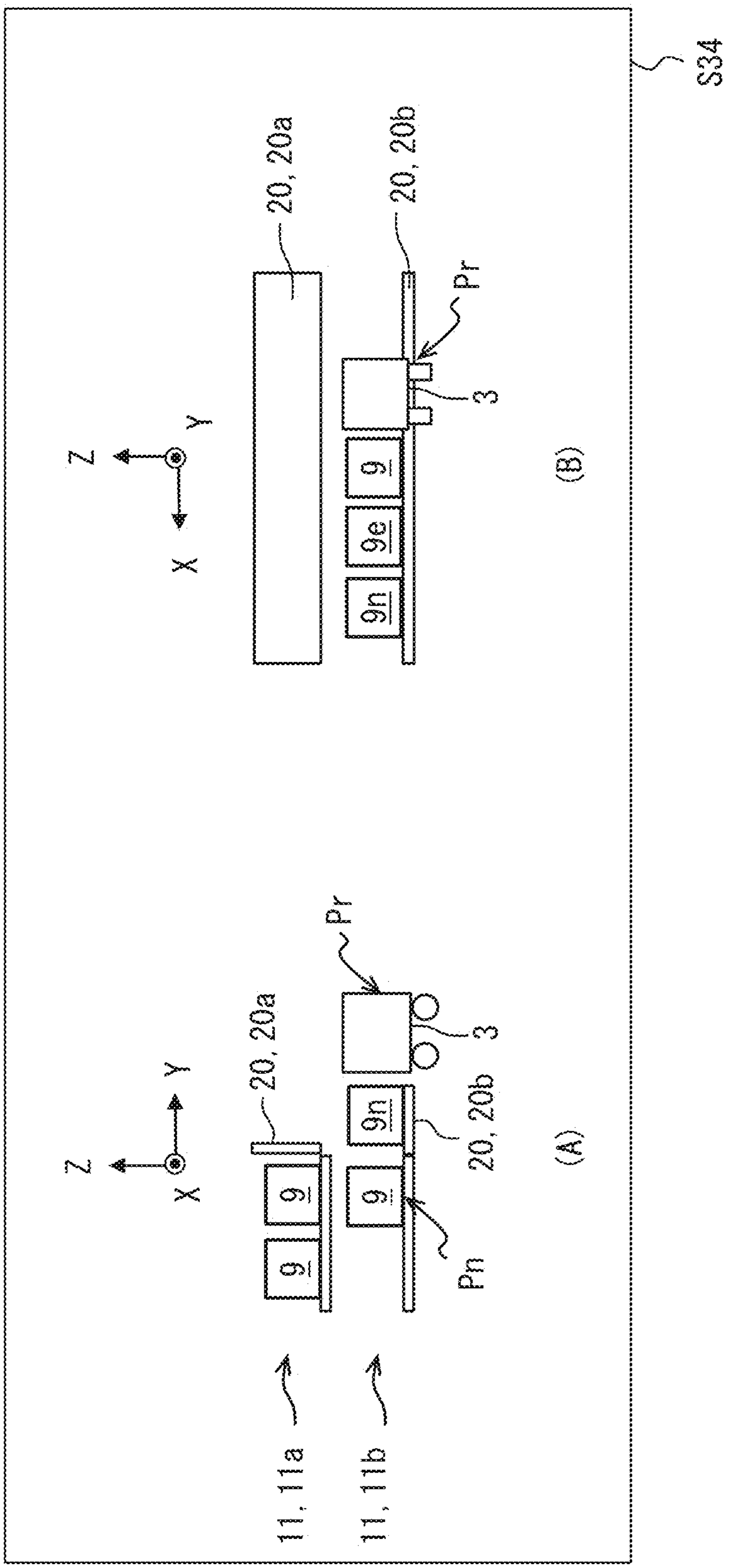
FIG. 33 is a diagram showing a cross-sectional view in (A) and a side view in (B) for an operation example of the transport system according to the third embodiment.
Figure 34:
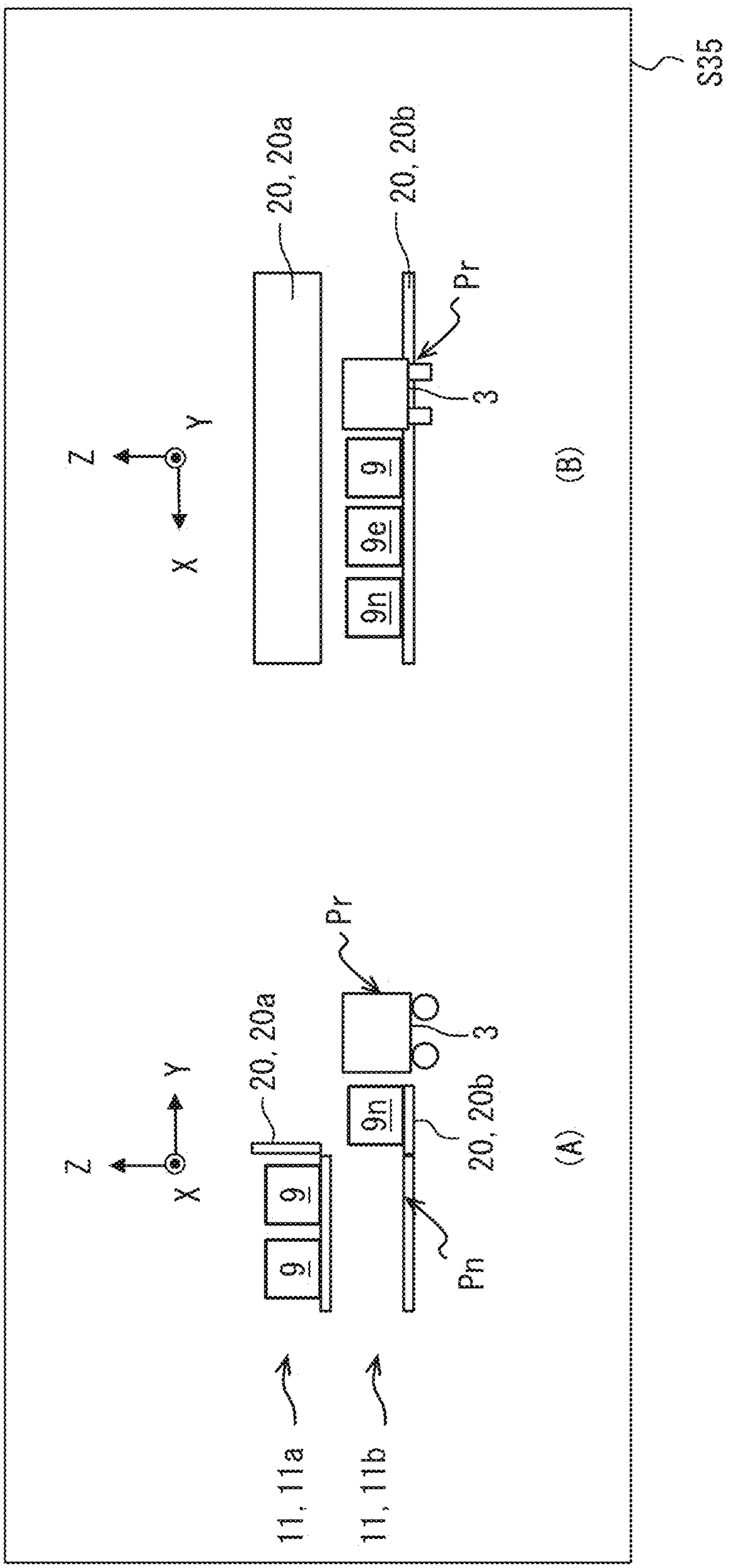
FIG. 34 is a diagram showing a cross-sectional view in (A) and a side view in (B) for an operation example of the transport system according to the third embodiment.

At S34 shown in FIG. 33, the control unit 60 controls the lower conveyor unit 30*b* to shift both the transport box 9*n* which is not the transfer target and has been retrieved from the luggage compartment 11 in the lateral direction Y and the empty transport box 9*e* that was received in the lateral direction Y from the transport robot 3, in the longitudinal direction X. At S35 shown in FIG. 34, the control unit 60 controls the lower conveyor unit 12*b* on which the transport box 9 is loaded together with the lower conveyor unit 30*b* so as to retrieve the transport box 9 as the transfer target from the lower layer 11*b* in the luggage compartment 11 in the lateral direction Y through the loading position Pn of the transport box 9*n* that is not the transfer target.

Figure 35:
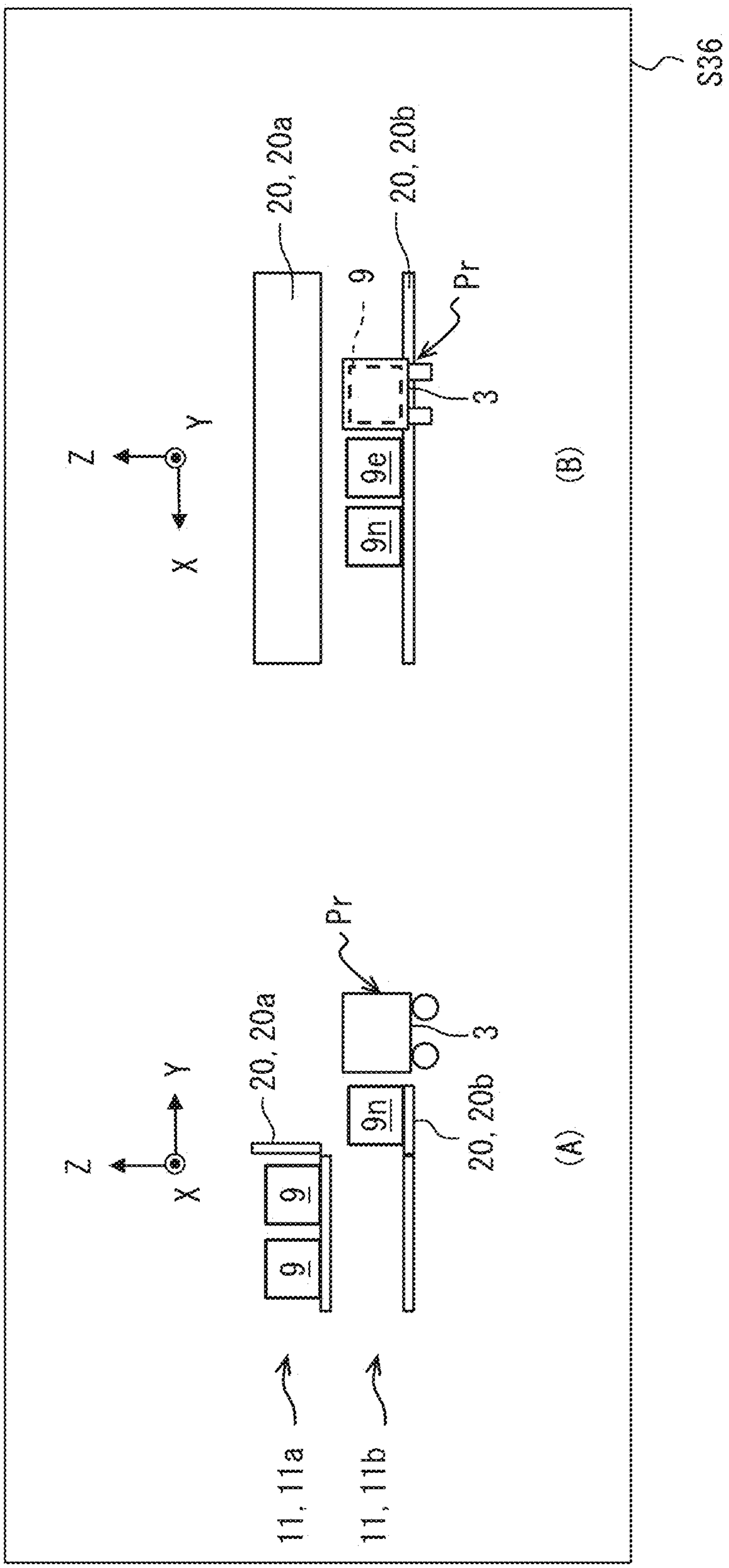
FIG. 35 is a diagram showing a cross-sectional view in (A) and a side view in (B) for an operation example of the transport system according to the third embodiment.
Figure 36:
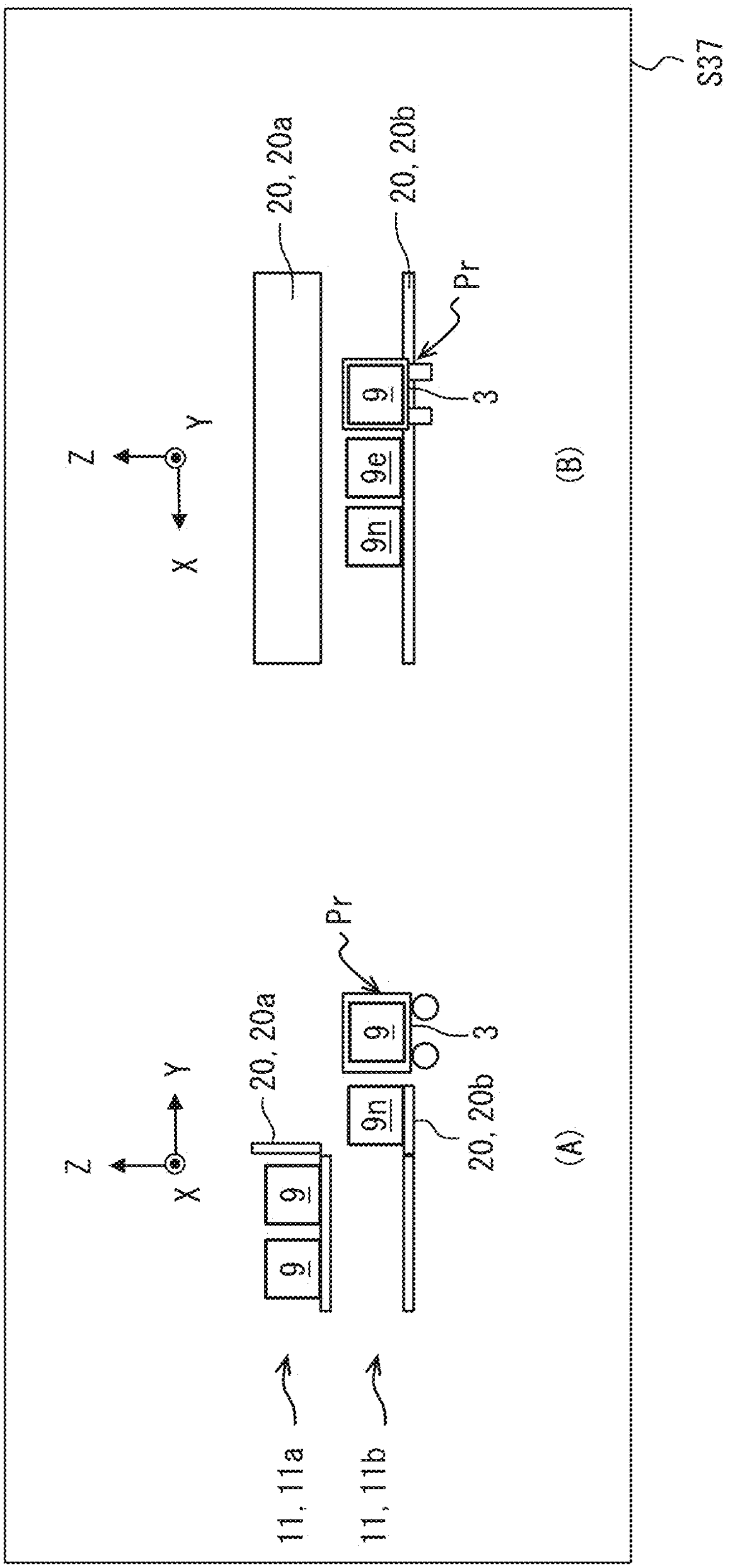
FIG. 36 is a diagram showing a cross-sectional view in (A) and a side view in (B) for an operation example of the transport system according to the third embodiment.

At S36 shown in FIG. 35, the control unit 60 controls the lower conveyor unit 30*b* to shift both the transport boxes 9*n*, 9 retrieved from the luggage compartment 11 in the lateral direction Y and the empty transport box 9*e* that was received in the lateral direction Y from the transport robot 3, in the longitudinal direction X. At S37 shown in FIG. 36, the control unit 60 controls the lower conveyor unit 30*b* to transfer the transport box 9, as the transfer target after the transport box 9 has been retrieved from the luggage compartment 11 in the lateral direction Y and shifted in the longitudinal direction X, to the transport robot 3 in the lateral direction Y. At this time, the control unit of the transport robot 3 may synchronize with the control of the control unit 60 via communication to control the transfer unit to receive the transport box 9 as the transfer target from the lower conveyor unit 30*b* in the lateral direction Y, thereby improving the transfer efficiency.

Figure 37:
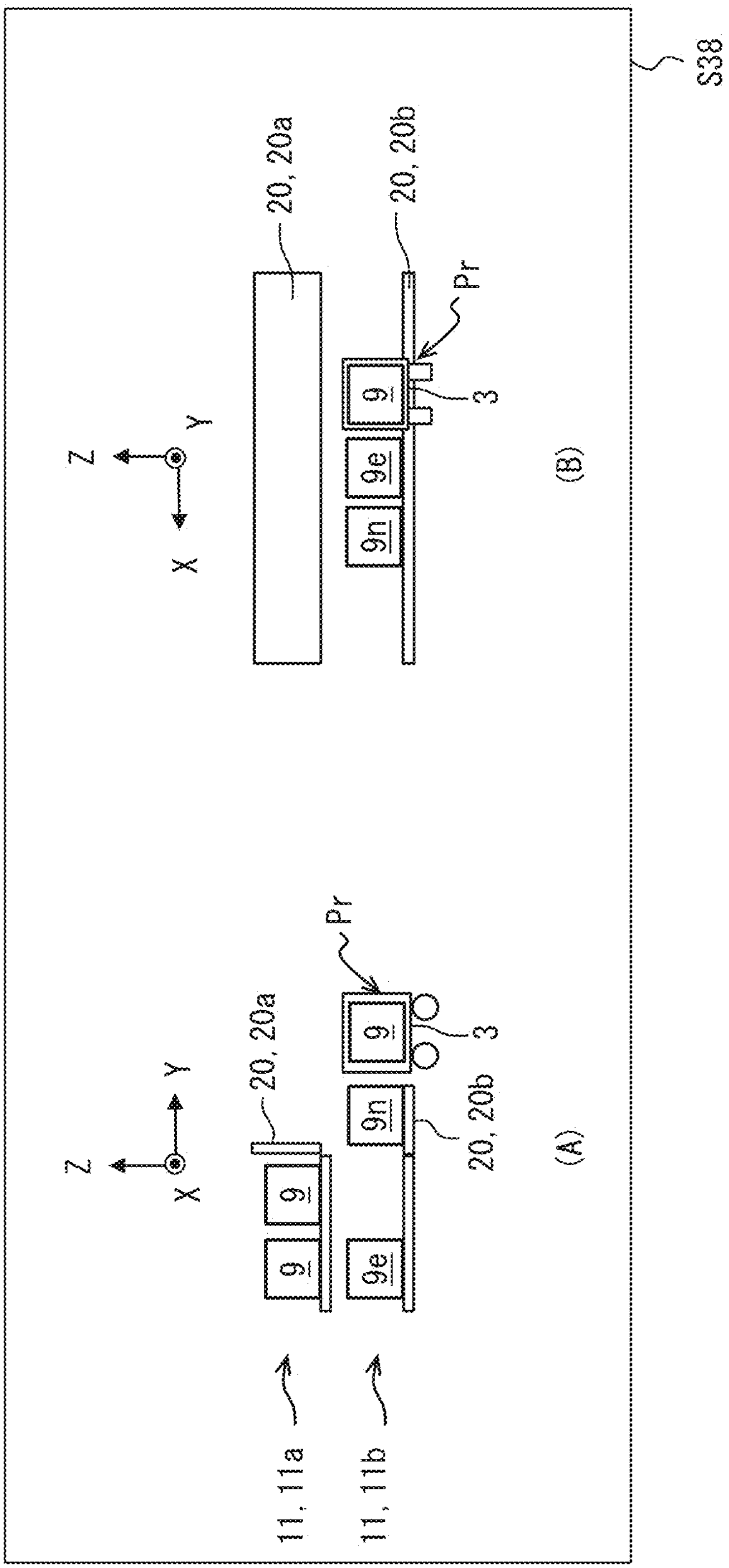
FIG. 37 is a diagram showing a cross-sectional view in (A) and a side view in (B) for an operation example of the transport system according to the third embodiment.

At S38 shown in FIG. 37, the control unit 60 controls the lower conveyor unit 30*b* to retrieve the empty transport box 9*e*, which has been received in the lateral direction Y from the transport robot 3 and shifted twice in the longitudinal direction X, to the lower layer 11*b* in the luggage compartment 11 in the lateral direction Y. At this time, the control unit 60 may also control the lower conveyor element 12*a* corresponding to the retrieve destination of the transport box 9*e*, thereby improving the retrieve efficiency. S33 may be performed prior to or simultaneously with S32.

Figure 38:
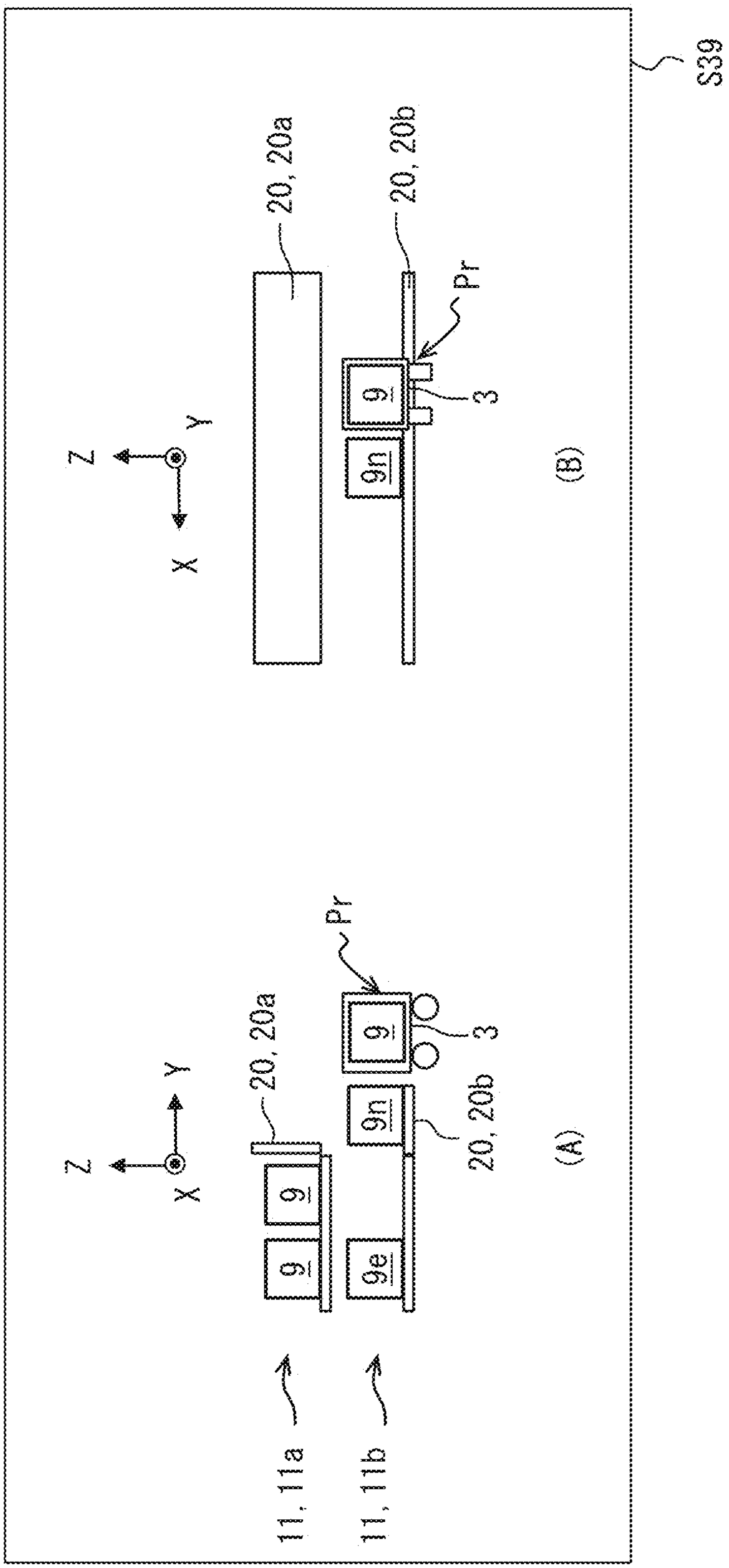
FIG. 38 is a diagram showing a cross-sectional view in (A) and a side view in (B) for an operation example of the transport system according to the third embodiment.
Figure 39:
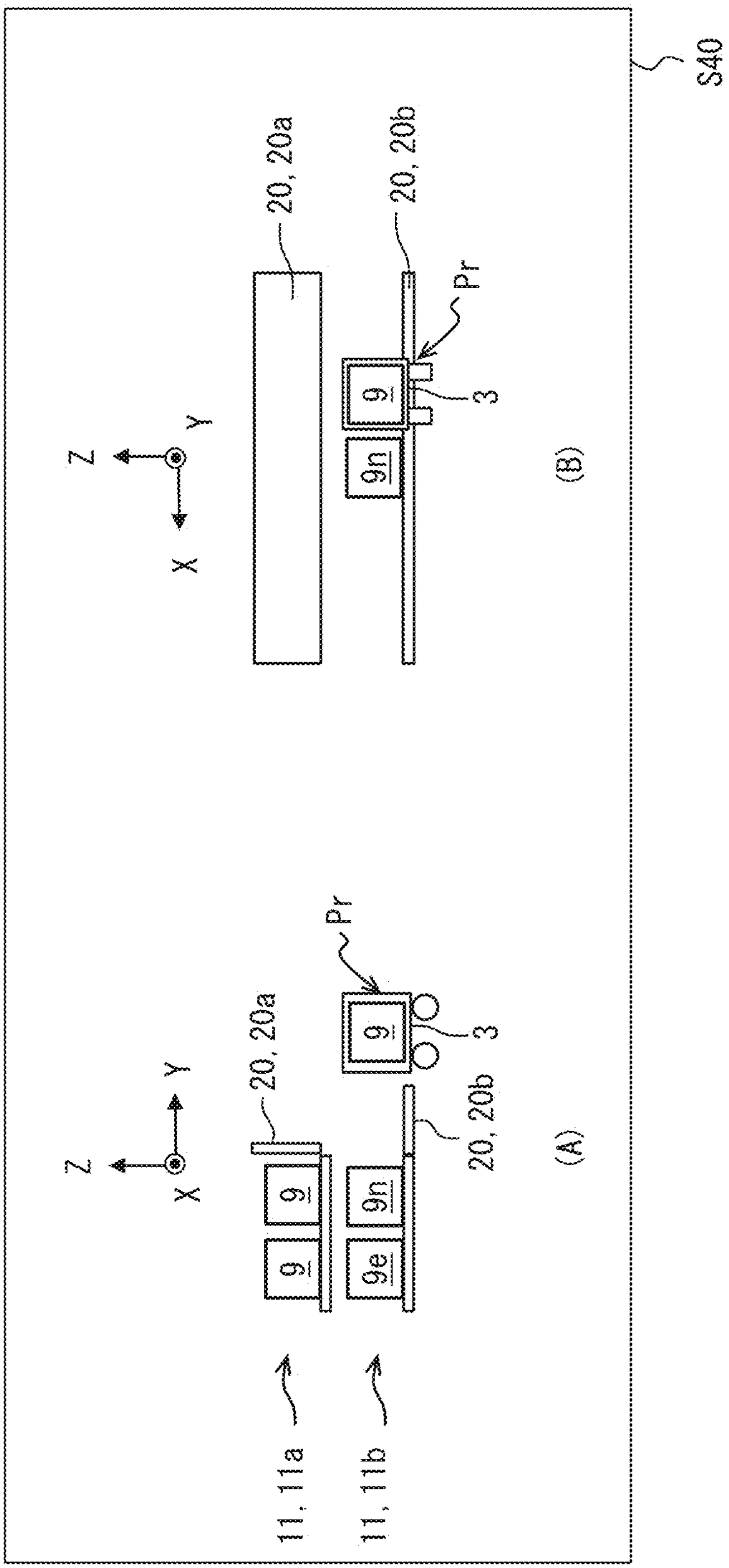
FIG. 39 is a diagram showing a cross-sectional view in (A) and a side view in (B) for an operation example of the transport system according to the third embodiment.

At S39 shown in FIG. 38, the control unit 60 controls the lower conveyor unit 30*b* to further shift in the longitudinal direction X the transport box 9*n* that is not the transfer target after being retrieved from the luggage compartment 11 in the lateral direction Y and shifted twice in the lateral direction X. At S40 shown in FIG. 39, the control unit 60 controls the lower conveyor unit 30*b* to retrieve the transport box 9*n* after being further shifted in the longitudinal direction X in this manner, to the lower layer 11*b* in the luggage compartment 11 in the lateral direction Y. At this time, the control unit 60 may also control the lower conveyor element 12*b* corresponding to the retrieve destination of the transport box 9*n*, thereby replacing the empty transport box 9 and improving the retrieve efficiency.

Furthermore, when the transport box 9 as the transfer target is transferred to the transport robot 3 under a condition that the transport box 9*n* that is not the transfer target and is loaded on the upper door unit 20*a* side in the lateral direction Y on the upper layer 11*a* of the luggage compartment 11, the control is added to S30 to S39. In this case, the opening/closing unit 21 of the upper door unit 20*a*, the upper conveyor element 12*a*, the upper conveyor unit 30*a*, and the lift unit 40 are sequentially controlled so that the lift-up at S23 and S27 in the second embodiment are appropriately combined in S30 to S39.

(Operation and Effects)

The operation and effect of the third embodiment described above will be described below.

According to the third embodiment, the transport boxes 9 accommodating the luggage 2 are accommodated in the luggage compartment 11 of the container unit 10 so as to be arranged in the longitudinal direction X and the lateral direction Y and to be replaced in the lateral direction Y. Therefore, the control unit 60 controls the conveyor unit 30 to retrieve the transport box 9*n* that is not the transfer target and is accommodated on the door unit 20 side in the lateral direction Y with reference to the transport box 9 as the transfer target, from the luggage compartment 11 in the lateral direction Y, and then to shift it in the longitudinal direction X. Furthermore, the control unit 60 controls the conveyor unit 30 to retrieve the transport box 9 as the transfer target from the luggage compartment 11 in the lateral direction Y through the loading position Pn before the transport box 9*n* which is not the transfer target is retrieved in the lateral direction Y, and then to transfer the transport box 9 to the transport robot 3. Thus, according to the above described series of the control, it is possible to efficiently transfer the luggage 2 from the luggage compartment 11, which has improved accommodation efficiency, using the transport box 9.

Fourth Embodiment

A fourth embodiment is a modification of the second embodiment.

Figure 40:
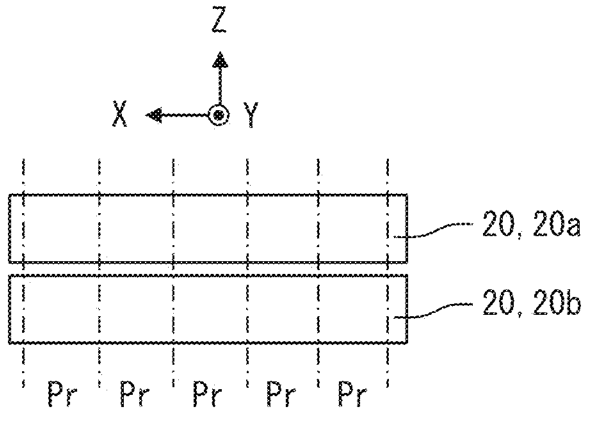
FIG. 40 is a schematic diagram showing a side view of a transport system according to a fourth embodiment.

The control unit 60 of the fourth embodiment defines a plurality of transfer positions Pr divided in the longitudinal direction X as shown in FIG. 40 as positions for transferring the transport box 9 accommodating the luggage 2 and retrieved in the lateral direction Y to the transport robot 3. Therefore, at least two or more transfer robots 3 serving as transfer destinations are assigned individual assigned positions Pra (see FIGS. 41 and 42 described later) from among a plurality of transfer positions Pr.

Figure 41:
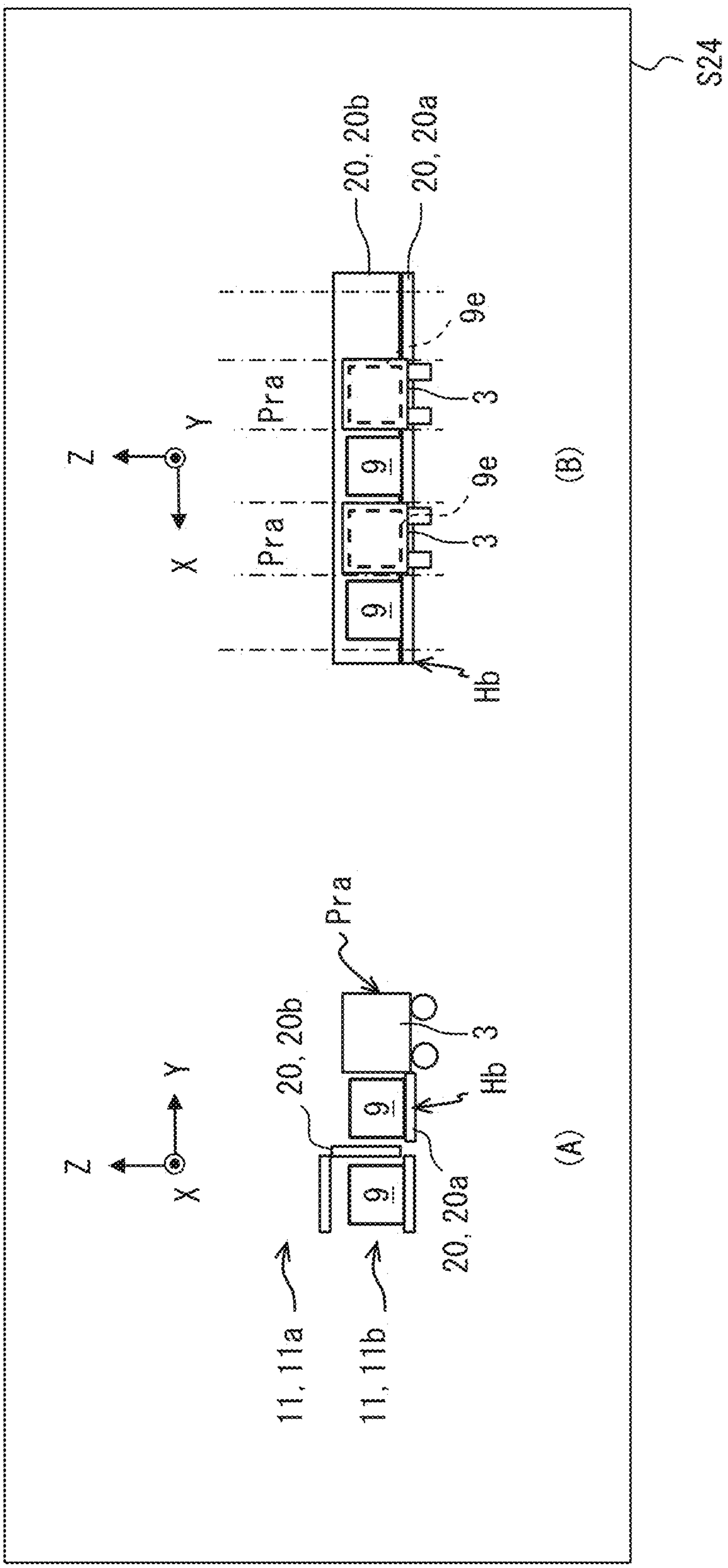
FIG. 41 is a diagram showing a cross-sectional view in (A) and a side view in (B) for an operation example of the transport system according to the fourth embodiment.
Figure 42:
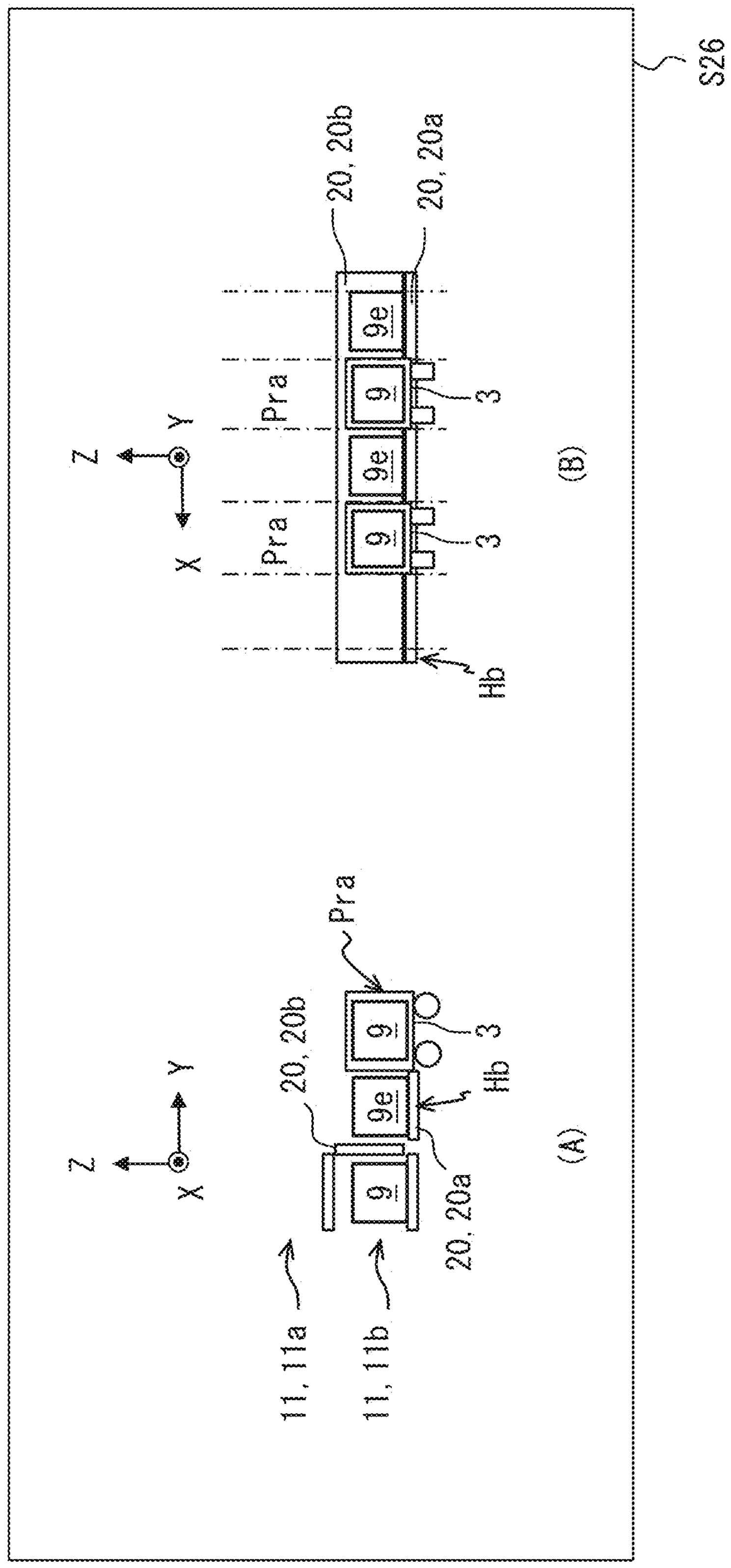
FIG. 42 is a diagram showing a cross-sectional view in (A) and a side view in (B) for an operation example of the transport system according to the fourth embodiment.

An operation example of the transport system 1 that operates under the control of the control unit 60 in the fourth embodiment will be described. The operation example of the fourth embodiment shown in FIGS. 41 and 42 is an example of the process up to the step where the transport box 9 as the transfer target, which is loaded on the upper layer 11*a* in the luggage compartment 11, is transferred to the transport robot 3.

Specifically, in the fourth embodiment, the control similar to S20 to S28 described in the second embodiment is performed simultaneously for two or more transport robots 3. Of this series of controls, particularly at S24, the upper conveyor unit 30*a* is controlled so as to receive an empty transport box 9*e* in the lateral direction Y at the assigned position Pra of each transport robot, as shown in FIG. 41. As shown in FIG. 42, at S26, the upper conveyor unit 30*a* is controlled to transfer the multiple transport boxes 9 accommodating the luggage 2, which have been retrieved in the lateral direction Y and shifted in the longitudinal direction X, and then have reached the assigned position Pra of each transport robot 3, to each of the transport robots 3 in the lateral direction Y.

(Operation and Effects)

The operation and effect of the fourth embodiment described above will be described below.

The control unit 60 according to the fourth embodiment controls the conveyor unit 30 to shift the luggage 2 accommodated in the transport box 9, which has been retrieved from the luggage compartment 11 in the lateral direction Y, in the longitudinal direction X to an assigned position Pra assigned to the transport robot 3 as the transfer destination among a plurality of transfer positions Pr divided in the longitudinal direction X. Thus, the control unit 60 can control the conveyor unit 30 to simultaneously transfer multiple pieces of luggage 2 that have been shifted to the assigned positions Pra to individual transport robots 3, thereby it is possible to improve the efficiency of transfer.

Other Embodiments

Although multiple embodiments have been described above, the present disclosure is not construed as being limited to these embodiments, and can be applied to various embodiments and combinations within a scope that does not depart from the gist of the present disclosure.

In the first embodiment, when the stopping position of the transport robot 3 is deviated in the longitudinal direction X from the transfer position Pr corresponding to the luggage 2, the luggage 2 may be shifted in the longitudinal direction X by the amount of the deviation by the conveyor unit 30 (i.e., 30*a*, 30*b*) in accordance with the second and third embodiments, and then may be transferred. The first and third embodiments may be implemented so that individual pieces of the luggage 2 are transferred to a plurality of transport robots 3 at a plurality of assigned positions Pra similar to the fourth embodiment. In the first to fourth embodiments, the conveyor element 12 (i.e., 12*a*, 12*b*) may be provided by a ball conveyor similar to the conveyor unit 30 (i.e., 30*a*, 30*b*) extending over the entire area of the loading area for multiple pieces of the luggage 2 in the longitudinal direction X for each layer 11*a*, 11*b*.

Figure 43:
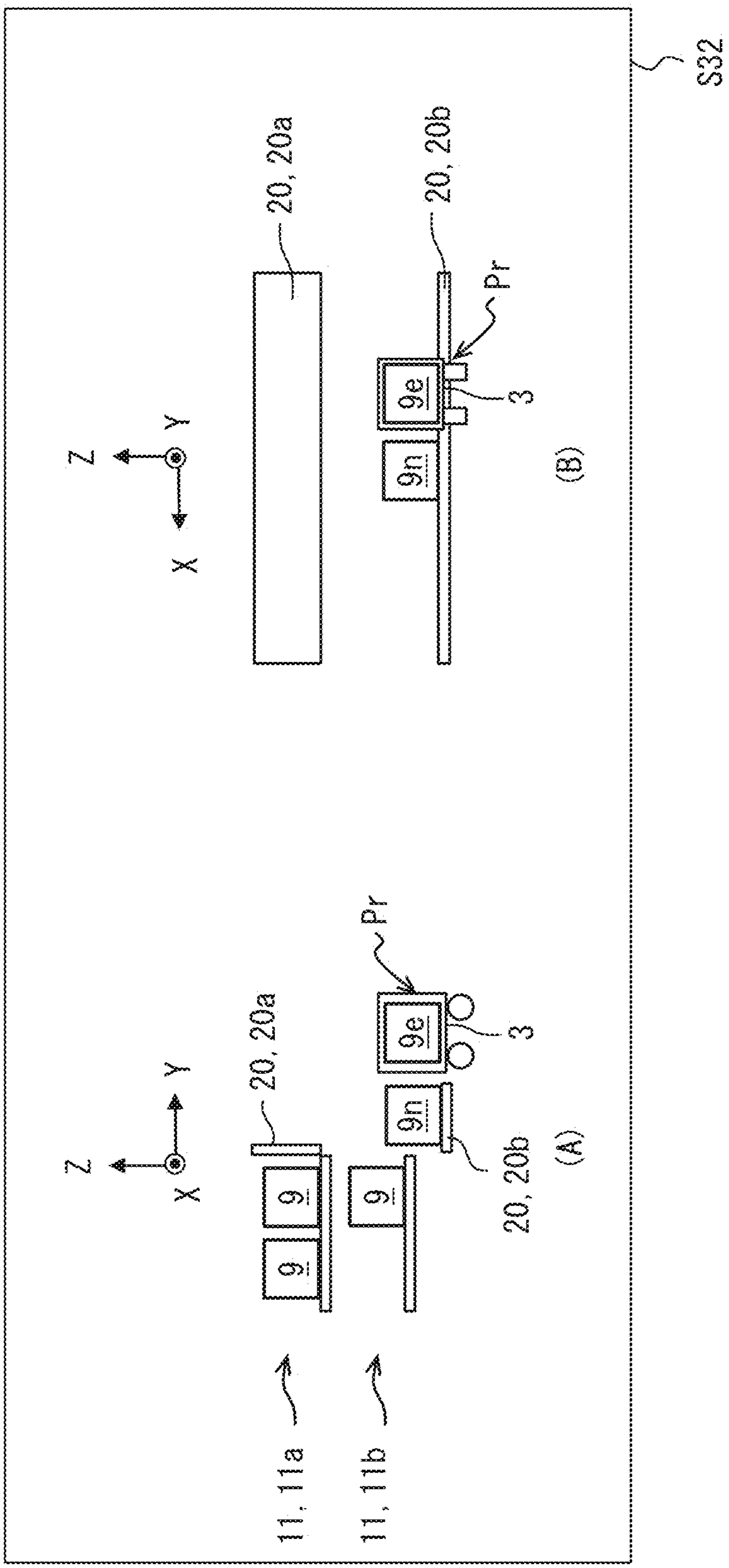
FIG. 43 is a schematic diagram showing a cross-sectional view in (A) and a schematic side view in (B) according to a modification example of the third embodiment.
Figure 44:
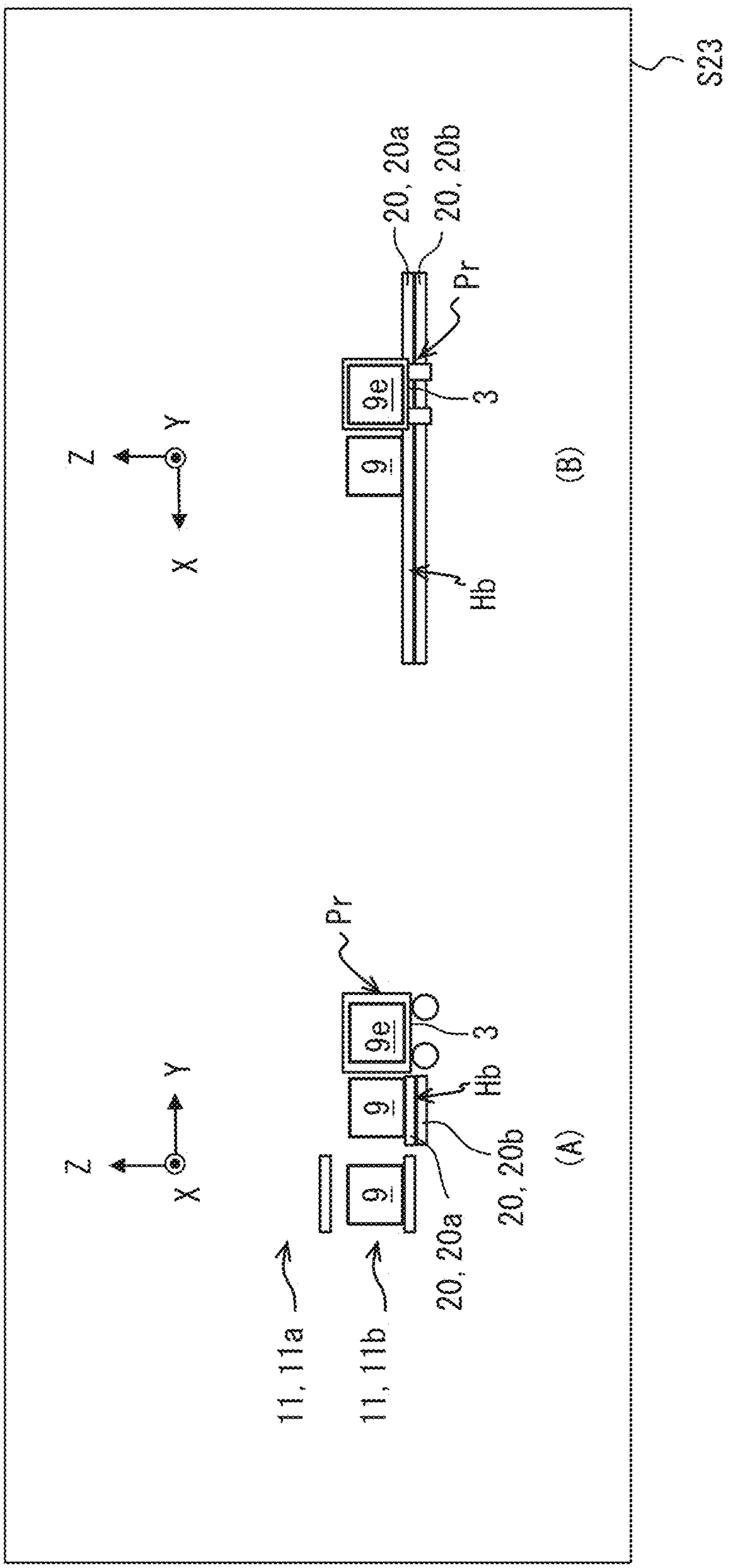
FIG. 44 is a schematic diagram showing a cross-sectional view in (A) and a schematic side view in (B) according to a modification example of the first embodiment.

In the first to fourth embodiments, each door unit 20 (i.e., 20*a*, 20*b*) may be lifted and driven by a lift unit 40 to an upper or lower position according to the relative height between the transport robot 3 and the container unit 10, as shown in FIG. 43 (in a case of the lower door unit 20*b* of the third embodiment). In the first to fourth embodiments, the lower door unit 20*b* may be in an open state when the upper door unit 20*a* is lifted down as shown in FIG. 44 (in a case of the first embodiment), and, in such a case, the lower door unit 20*b* may be lifted down by the lift unit 40 in response to the lifting down of the upper door unit 20*a*.

In the first to fourth embodiments, the upper layer 11*a* and its upper conveyor element 12*a*, the upper door unit 20*a* and its opening/closing unit 21, the upper conveyor unit 30*a*, and the lift unit 40 may be omitted. In this case, the transport system 1 may include a container unit 10 having a lower conveyor element 12*b* on the lower layer 11*b*, a lower door unit 20*b* and its opening/closing unit 21, a lower conveyor unit 30*b*, a communication unit 50, and a control unit 60.

The operation of receiving an empty transport box 9*e* from a transport robot 3 according to the first to fourth embodiments may be applied to the operation of receiving the luggage 2 or a transfer box 9 accommodating the luggage 2 from a transport robot 3 in a logistics warehouse Wd. The operation of transferring the transfer box 9 accommodating the luggage 2 to the transport robot 3 according to the second to fourth embodiments may be applied to the operation of transfer of an empty transfer box 9*e* to the transport robot 3 in the logistics warehouse Wd.

APPENDIX

The present specification discloses a plurality of technical ideas listed below and a plurality of combinations thereof.

Technical Feature 1

A transport system is mounted on a load bed of a cargo vehicle and transports a plurality of pieces of luggage so as to be able to be transferred to a transport robot.

The transport system includes:

- a container unit that accommodates the luggage in a luggage compartment to be arranged in a longitudinal direction that is longer than a lateral direction in the cargo vehicle;
- a door unit that opens and closes in the lateral direction with respect to the container unit;
- a conveyor unit that retrieves the luggage from the luggage compartment in the lateral direction through the door unit which is in an open state, and transports the luggage to a transport robot; and
- a control unit having at least one processor; and a memory storing instructions configured to, when executed by the processor, cause the processor to: control an opening operation and a closing operation of the door unit and a displacement of the luggage by the conveyor unit.

Technical Feature 2

The transport system according to the technical feature 1, further includes:

- a lift unit that drives the door unit in a height direction of the cargo vehicle.

The container unit accommodates the luggage in the luggage compartment by arranging each of the plurality of pieces of the luggage in a longitudinal direction and a lateral direction, respectively.

The control unit for controlling a driving operation of the door unit by the lift unit, performs:

- controlling the lift unit so as to lift down, in the height direction, the door unit in the open state that supports the luggage retrieved in the lateral direction from the luggage compartment; and
- controlling the conveyor unit so as to transfer the luggage, supported by the door unit lifted down in the open state, to the transport robot in the lateral direction.

Technical Feature 3

In the transport system according to the technical feature 1 or 2, the conveyer unit is configured to displace each of the plurality of pieces of the luggage in both the lateral direction and the longitudinal direction, and displacement in each of the lateral direction and the longitudinal direction is controlled by the control unit.

Technical Feature 4

In the transport system according to the technical feature 3, the control unit performs:

controlling the conveyor unit to retrieve the luggage in the lateral direction from the luggage compartment; and controlling the conveyor unit to shift the luggage, retrieved in the lateral direction from the luggage compartment, to a transfer position (Pr) for the transport robot that has stopped for receipt.

Technical Feature 5

In the transport system according to the technical feature 3, the control unit performs:

controlling the conveyor unit to retrieve the luggage in the lateral direction from the luggage compartment; and controlling the conveyor unit to shift the luggage, retrieved in the lateral direction from the luggage compartment, to an assigned transfer position (Pra) assigned to the transfer robot as a transfer destination in the longitudinal direction, the assigned transfer position being one of a plurality of transfer positions (Pr) which are divided in the longitudinal direction; and controlling the conveyor unit to transfer the luggage that has been shifted to the assigned transfer position to the transport robot in the lateral direction.

Technical Feature 6

In the transport system according to any one of the technical features 3 to 5, the container unit accommodates the luggage in a transport box having a predetermined size and accommodates the transport box in the luggage compartment, and the control unit performs:

controlling the conveyor unit to retrieve the transport box accommodating the luggage from the luggage compartment in the lateral direction;

controlling the conveyor unit to receive the transport box, in which the luggage has been transported, from the transport robot in the lateral direction;

controlling the conveyor unit to shift both the transport box retrieved in the lateral direction from the luggage compartment and the transport box received in the lateral direction from the transport robot, in the longitudinal direction;

controlling the conveyor unit to transfer the transport box, which has been retrieved in the lateral direction from the luggage compartment and shifted in the longitudinal direction, to the transport robot in the lateral direction; and controlling the conveyor unit to retrieve the transport box, which has been received in the lateral direction from the transport robot and shifted in the longitudinal direction, into the luggage compartment in the lateral direction.

Technical Feature 7

The transport system according to the technical feature 1, further includes: a lift unit that drives the door unit in a height direction of the cargo vehicle.

The container unit accommodates the transport box in the luggage compartment by arranging each of a plurality of pieces of the transport box in the longitudinal direction and the lateral direction, respectively.

The control unit for controlling a driving operation of the door unit by the lift unit performs: controlling the lift unit to lift down the door unit in the height direction, which supports the transport box retrieved in the lateral direction from the luggage compartment in an open state before the transport box is shifted in the longitudinal direction.

Technical Feature 8

In the transport system according to the feature 7, the control unit performs:

controlling the conveyor unit to reverse the transport box in the longitudinal direction after the transport box is received from the transport robot in the lateral direction and shifted in the longitudinal direction;

controlling the lift unit to lift up the door unit in the height direction, which supports the transport box in an open state after the transport box is received in the lateral direction from the transport robot and shifted in the longitudinal direction; and controlling the conveyor unit to retrieve the transport box into the luggage compartment in the lateral direction after performing a reverse operation and a lift up operation in a predetermined order.

Technical Feature 9

In the transport system according to any one of the technical features 6 to 8, the container unit accommodates the transport box in the luggage compartment to be movable in the lateral direction by arranging each of the plurality of pieces of the transport box in the longitudinal direction and the lateral direction, respectively.

The control unit performs:

controlling the conveyor unit to retrieve the transport box in the lateral direction from the luggage compartment, which is not the transfer target and is accommodated on a door unit side with respect to the transport box as the transfer target in the lateral direction;

controlling the conveyor unit to shift the transport box in the longitudinal direction, which is not the transfer target and is retrieved from the luggage compartment; and controlling the conveyor unit to retrieve the transport box as the transfer target from the luggage compartment in the lateral direction through a loading position (Pn) before the transport box not the transfer target is retrieved in the lateral direction, and then, to transfer the transport box as the transfer target to the transport robot.

Technical Feature 10

A cargo vehicle equipped with the transport system according to any one of the technical features 1 to 9.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A transport system mounted on a load bed of a cargo vehicle for transporting a plurality of pieces of luggage to be transferred to a transport robot, the transport system comprising:

a container unit that accommodates the luggage in a luggage compartment to be arranged in a longitudinal direction that is longer than a lateral direction in the cargo vehicle;

a door unit that opens and closes in the lateral direction with respect to the container unit;

a conveyor unit that retrieves the luggage from the luggage compartment in the lateral direction through the door unit in an open state and transfers the luggage to the transport robot; and a control unit that controls an opening operation and a closing operation of the door unit and a displacement of the luggage by the conveyor unit.

2. The transport system according to claim 1, further comprising:

a lift unit that drives the door unit in a height direction of the cargo vehicle, wherein:

the container unit accommodates the luggage in the luggage compartment by arranging the luggage in both the longitudinal direction and the height direction;

the control unit for controlling a driving of the door unit by the lift unit performs:

controlling the lift unit to lift down, in the height direction, the door unit that supports the luggage retrieved in the lateral direction from the luggage compartment and is in the open state; and controlling the conveyor unit to transfer the luggage lifted down and supported by the door unit in the open state to the transport robot in the lateral direction.

3. The transport system according to claim 1, wherein:

the conveyor unit is configured to displace the luggage in each of the lateral direction and the longitudinal direction, respectively; and displacement in each of the lateral direction and the longitudinal direction using the conveyor unit is controlled by the control unit.

4. The transport system according to claim 3, wherein:

the control unit performs:

controlling the conveyor unit to retrieve the luggage from the luggage compartment in the lateral direction; and controlling the conveyor unit to shift the luggage, retrieved from the luggage compartment in the lateral direction, in the longitudinal direction to a transfer position (Pr) to the transport robot that has stopped for receiving the luggage.

5. The transport system according to claim 3, wherein:

the control unit performs:

controlling the conveyor unit to retrieve the luggage from the luggage compartment in the lateral direction;

controlling the conveyor unit to shift the luggage, retrieved in the lateral direction from the luggage compartment, to an assignment transfer position assigned to the transport robot as a transfer destination in the longitudinal direction, the assignment transfer position being one of a plurality of transfer positions which are divided in the longitudinal direction; and controlling the conveyor unit to transfer the luggage that has been shifted to the assignment transfer position to the transport robot in the lateral direction.

6. The transport system according to claim 3, wherein:

the container unit accommodates the luggage in a transport box having a predetermined size and accommodates the transport box in the luggage compartment, and the control unit performs:

controlling the conveyor unit to retrieve the transport box accommodating the luggage from the luggage compartment in the lateral direction;

controlling the conveyor unit to receive the transport box, in which the luggage has been transported, from the transport robot in the lateral direction;

controlling the conveyor unit to shift both the transport box retrieved in the lateral direction from the luggage compartment and the transport box received in the lateral direction from the transport robot, in the longitudinal direction;

controlling the conveyor unit to transfer the transport box, which has been retrieved in the lateral direction from the luggage compartment and shifted in the longitudinal direction, to the transport robot in the lateral direction; and controlling the conveyor unit to retrieve the transport box, which has been received in the lateral direction from the transport robot and shifted in the longitudinal direction, into the luggage compartment in the lateral direction.

7. The transport system according to claim 6, further comprising:

a lift unit that drives the door unit in a height direction of the cargo vehicle, wherein:

the container unit accommodates the transport box in the luggage compartment by arranging the transport box in both the longitudinal direction and the height direction; and the control unit for controlling a driving of the door unit by the lift unit performs: controlling the lift unit to lift down the door unit in the height direction, which supports the transport box retrieved in the lateral direction from the luggage compartment and is in an open state before the transport box is shifted in the longitudinal direction.

8. The transport system according to claim 7, wherein:

the control unit performs:

controlling the conveyor unit to reverse the transport box in the longitudinal direction after the transport box is received from the transport robot in the lateral direction and shifted in the longitudinal direction;

controlling the lift unit to lift up the door unit in the height direction, which supports the transport box in an open state after the transport box is received in the lateral direction from the transport robot and shifted in the longitudinal direction; and controlling the conveyor unit to retrieve the transport box into the luggage compartment in the lateral direction after performing a reverse operation and a lift up operation in a predetermined order.

9. The transport system according to claim 6, wherein:

the container unit accommodates the transport box in the luggage compartment to be movable in the lateral direction by arranging each of the plurality of pieces of the transport box in the longitudinal direction and the lateral direction, respectively; and the control unit performs:

controlling the conveyor unit to retrieve the transport box in the lateral direction from the luggage compartment, which is not a transfer target and is accommodated on a door unit side with respect to the transport box as the transfer target in the lateral direction;

controlling the conveyor unit to shift the transport box in the longitudinal direction, which is not the transfer target and is retrieved from the luggage compartment; and controlling the conveyor unit to retrieve the transport box as the transfer target from the luggage compartment in the lateral direction through a loading position before the transport box not the transfer target is retrieved in the lateral direction, and then, to transfer the transport box as the transfer target to the transport robot.

10. The transport system according to claim 1, further comprising:

at least one processor, and a memory storing instructions configured to, when executed by the processor, cause the processor to provide the control unit.

11. A cargo vehicle equipped with the transport system according to claim 1.

* * * * *